(12) United States Patent  
Hirokawa et al.

(10) Patent No.: US 11,543,186 B2  
(45) Date of Patent: Jan. 3, 2023

(54) HEAT EXCHANGER

(71) Applicant: DAIKIN INDUSTRIES, LTD., Osaka (JP)

(72) Inventors: Tomoki Hirokawa, Osaka (JP); Shun Yoshioka, Osaka (JP); Tooru Andou, Osaka (JP); Yoshiyuki Matsumoto, Osaka (JP); Hideyuki Kusaka, Osaka (JP); Hiroyuki Nakano, Osaka (JP); Yoshio Oritani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/280,657

(22) PCT Filed: Aug. 30, 2019

(86) PCT No.: PCT/JP2019/034235  
§ 371 (c)(1),  
(2) Date: Mar. 26, 2021

(87) PCT Pub. No.: WO2020/066462  
PCT Pub. Date: Apr. 2, 2020

(65) Prior Publication Data  
US 2022/0042745 A1   Feb. 10, 2022

(30) Foreign Application Priority Data  
Sep. 28, 2018   (JP) .............................. JP2018-185788

(51) Int. Cl.  
*F28F 9/02* (2006.01)  
*F28D 1/053* (2006.01)  
(Continued)

(52) U.S. Cl.  
CPC ............ *F28D 1/05383* (2013.01); *F28F 1/32* (2013.01); *F28F 9/0221* (2013.01);  
(Continued)

(58) Field of Classification Search  
CPC ...... F28F 9/0278; F28F 9/0221; F28F 9/0224; F25B 39/028  
See application file for complete search history.

(56) References Cited

U.S. PATENT DOCUMENTS 2,676,470 A * 4/1954 Streitz .................... F25B 41/30  
138/44  
5,265,672 A   11/1993 Aoki  
(Continued)

FOREIGN PATENT DOCUMENTS

CN    107314691 A    11/2017  
DE    102005059920 A1 *   6/2007   ........... F28D 1/0476  
(Continued)

OTHER PUBLICATIONS

International Search Report issued in International Application No. PCT/JP2019/034235, dated Nov. 26, 2019 (5 pages).  
(Continued)

*Primary Examiner* — Eric S Ruppert  
(74) *Attorney, Agent, or Firm* — Osha Bergman Watanabe & Burton LLP

(57) ABSTRACT

A heat exchanger includes: a header that extends in a first direction; and a plurality of heat transfer tubes that extend in a second direction crossing the first direction, each of which has one end connected to the header, and that are arranged in the first direction at intervals. The header includes: a header body having a tubular shape, a first member through which the one end of each of the heat transfer tubes extends, and a second member positioned between the header body and the first member in the second direction. The second member includes: a base portion that extends in the first direction, and a plurality of protruding portions that extend from the base portion toward the first member in the second direction.

17 Claims, 23 Drawing Sheets

(51) Int. Cl.
    *F28F 1/32*     (2006.01)
    *F28D 21/00*     (2006.01)

(52) U.S. Cl.
    CPC .......... *F28F 9/0229* (2013.01); *F28F 9/0263* (2013.01); *F28F 9/0265* (2013.01); *F28F 9/0278* (2013.01); *F28D 2021/0068* (2013.01); *F28F 2215/12* (2013.01); *F28F 2275/122* (2013.01)

(56) References Cited

U.S. PATENT DOCUMENTS

2013/0175013 A1*   7/2013   Yoshioka ............. B23K 1/0012
                                                                                165/165
2013/0292104 A1   11/2013   Park et al.

FOREIGN PATENT DOCUMENTS

| | | |
|---|---|---|
| JP | 2012-093075 A | 5/2012 |
| JP | 2013-015233 A | 1/2013 |
| JP | 2013-139917 A | 7/2013 |
| JP | 2013-234839 A | 11/2013 |
| JP | 2013-249993 A | 12/2013 |
| JP | 2018-071860 A | 5/2018 |
| WO | 2015/037097 A1 | 3/2015 |
| WO | 2016/076259 A1 | 5/2016 |

OTHER PUBLICATIONS

Written Opinion issued in International Application No. PCT/JP2019/034235, dated Nov. 26, 2019 (6 pages).
Extended European Search Report issued in corresponding European Patent Application No. 19867894.8 dated Sep. 23, 2021 (5 pages).

* cited by examiner

HEAT EXCHANGER

TECHNICAL FIELD

The present disclosure relates to a heat exchanger.

BACKGROUND

Some existing heat exchangers include a header extending in the longitudinal direction and a plurality of heat transfer tubes that extend in a direction crossing the longitudinal direction of the header and that are connected to the header. For example, PTL 1 (Japanese Unexamined Patent Application Publication No. 2018-71860) discloses a heat exchanger including a header extending in the vertical direction and a plurality of heat transfer tubes that are arranged in the vertical direction and each of which has an end portion connected to the header.

PATENT LITERATURE

PTL 1: Japanese Unexamined Patent Application Publication No. 2018-71860

With such a heat exchanger, if the insertion length of each heat transfer tube inserted into the header is not appropriately provided, the heat transfer tube may become extracted from the header during assembly of the heat exchanger. The present disclosure provides a heat exchanger that excels in ease of assembly.

SUMMARY

A heat exchanger according to one or more embodiments includes a header and a plurality of heat transfer tubes. The header extends in a first direction. The heat transfer tubes extend in a second direction. The second direction is a direction crossing the first direction. One end of each of the heat transfer tubes is connected to the header. The plurality of heat transfer tubes are arranged in the first direction at intervals. The header includes a header body, a first member, and a second member. The header body has a tubular shape. One end of each of the heat transfer tubes extends through the first member. The second member is positioned between the header body and the first member in the second direction. The second member includes a base portion and a plurality of protruding portions. The base portion extends in the first direction. The protruding portions extend from the base portion toward the first member in the second direction.

The header body is not limited, provided that the header body has a tubular shape. For example, the header body may be a tubular structure that has an inner space having a cylindrical or polygonal columnar shape or the like and having the longitudinal direction in the first direction and that has a cylindrical or polygonal columnar outer shape. The tubular structure may be formed of a single member or may be formed by joining a plurality of members. If the tubular structure is formed of a plurality of members, the tubular structure may be formed by stacking a plurality of plate-shaped members, each having a through hole, in the plate-thickness direction.

Thus, the insertion length of the heat transfer tube inserted into the header can be more appropriately provided. Therefore, extraction of the heat transfer tube from the header during assembly of the heat exchanger is prevented. For example, when the members are fixed to each other by brazing, extraction of the heat transfer tube from the header after finishing the brazing step is prevented. Thus, the heat exchanger excels in ease of assembly.

Here, the meaning of the term "tubular" includes the meaning of "cylindrical". The meaning of the term "tubular" includes the meaning of shaped like a "prismatic tube".

Here, the "protruding portion" is a part that extends from the base portion toward the first member in the second direction, and the shape and configuration thereof are selected as appropriate in accordance with design specifications. The length of the protruding portion in the second direction is set to a length that is necessary to provide an appropriate insertion length of the heat transfer tube into the header. To be specific, when the members are fixed to each other by brazing, the length of the protruding portion in the second direction is set as to provide an insertion length with which extraction of the heat transfer tube from the header after finishing the brazing step is prevented.

Here, the direction in which the heat transfer tube extends and the direction in which the protruding portion extends need not be parallel.

In the present specification, the meaning of the phrase "extends in a direction" includes not only the meaning that something extends strictly in the direction but also the meaning that something extends at a predetermined angle with respect to the direction. For example, a case where something extends in a direction that is inclined at an angle less than or equal to 45 degrees with respect to a predetermined direction, it is interpreted that it extends "in the predetermined direction".

In one or more embodiments, the protruding portions are joined to the first member. Here, the meaning of the term "joining" includes welding and includes, for example, fixing members to each other by brazing. Therefore, the insertion length of the heat transfer tube inserted into the header is more reliably and appropriately provided.

In one or more embodiments, a length of each of the protruding portions in the second direction is greater than or equal to 2 mm Therefore, the length of the protruding portion in the second direction is set to a length that is necessary to provide an appropriate insertion length of the heat transfer tube into the header. For example, when the members are fixed to each other by brazing, the length of the protruding portion in the second direction is set so as to provide an insertion length with which extraction of the heat transfer tube from the header after finishing the brazing step is prevented.

In one or more embodiments, the plurality of protruding portions are arranged in the first direction at intervals greater than or equal to 1 mm Therefore, for example, when the members are fixed to each other by brazing, a brazing material is prevented from becoming locally accumulated in the header.

In one or more embodiments, a length of the first space in the third direction is greater than a length of each of the heat transfer tubes in the third direction. The first space is a space surrounded by the base portion and the protruding portions that are adjacent to each other. The third direction is a direction crossing the first direction and the second direction. Therefore, a tip end of the heat transfer tube is prevented from contacting a member that is positioned outside of the first space in the third direction and that covers the first space.

In one or more embodiments, the first member covers the first space. Therefore, increase of the number of constituent members of the header is prevented.

In one or more embodiments, a communication hole is formed in the base portion. The communication hole allows the first space and an inner space of the header body to communicate with each other. Therefore, the first space, which is surrounded by the base portion and the protruding portions that are adjacent to each other, and the space in the header body communicate with each other, and a flow path is formed between the first space and the inner space of the header body.

In one or more embodiments, a part of an edge that forms the communication hole of the base portion, the part being positioned on the heat transfer tube side, is chamfered. Therefore, during assembly of the heat exchanger, it is possible to perform temporary fixing by pressing an end of the heat transfer tube against the edge portion forming the communication hole. Thus, it is easier to make the insertion lengths of the heat transfer tubes uniform, and it is easy to assemble the heat exchanger.

In one or more embodiments, an area of the communication hole is greater than a cross-sectional area of a refrigerant flow path formed in the heat transfer tube. Here, "the cross-sectional area of a refrigerant flow path" is the sum value of the cross-sectional areas of refrigerant flow paths when a plurality of refrigerant flow paths are formed in the heat transfer tube. Therefore, a large refrigerant flow path is formed between the inner space of the header body and the heat transfer tube. As a result, pressure loss of a refrigerant that flows through the communication hole is prevented.

In one or more embodiments, the heat transfer tubes are flat tubes. A plurality of refrigerant flow paths are formed in each of the flat tubes. Therefore, regarding a case where the heat transfer tubes are flat tubes, which are particularly likely to be extracted from the header during assembly, extraction of the heat transfer tubes from the header during assembly is prevented.

In one or more embodiments, a length of the base portion in the second direction is less than a length of each of the protruding portions in the first direction. Therefore, it is easy to process the base portion. For example, regarding the base portion, it is easy to form a hole by press-working, cutting, and the like.

In one or more embodiments, the length of each of the protruding portions in the first direction is greater than or equal to twice the length of the base portion in the second direction. Therefore, it is easier to process the base portion.

In one or more embodiments, the length of the base portion in the second direction is less than or equal to 4 mm Therefore, regarding the base portion, it is easy to form a hole by using a press-working method that excels in mass productivity.

In one or more embodiments, the second member is formed by extrusion. Therefore, it is easy to produce the second member.

In one or more embodiments, the first direction is a vertical direction. Therefore, it is possible to improve ease of assembly of a heat exchanger including a header that extends in the vertical direction.

In one or more embodiments, a brazing material is disposed between the header body and the base portion. The brazing material joins the header body and the base portion.

Therefore, it is possible to join the header body and the second member by brazing. Because the brazing material is disposed between the header body and the base portion, during a brazing process, flowing of the brazing material to the heat transfer tube is prevented, and blocking of the refrigerant flow path of the heat transfer tube by the brazing material is suppressed.

In one or more embodiments, the header further includes a penetration member. The penetration member extends in the second direction. The penetration member extends through the header body, the first member, and the second member. Therefore, when assembling the members of the heat exchanger together, it is easy to temporarily fix the members to each other.

In one or more embodiments, a plurality of engagement holes are formed in one of the header body and the first member. Engagement portions are formed in the other of the header body and the first member. The engagement portions engage with the engagement holes. Therefore, when assembling the members of the heat exchanger together, it is easy to temporarily fix the members to each other. Here, the meaning of the phrase "engage with the engagement holes" includes the meaning of fitting into the engagement holes. Moreover, the meaning of the phrase "engage with the engagement holes" includes the meaning that the engagement portions engage with edges that form the engagement holes.

In one or more embodiments, the first member is a member that extends in the first direction. The first member includes a first portion and a second portion. The first portion is positioned on the heat transfer tube side relative to the second member. The heat transfer tubes are inserted into the first portion. The second portion extends in the second direction from each of two ends of the first portion in a transversal direction. The second portion engages with the header body. Therefore, when assembling the members of the heat exchanger together, it is easy to temporarily fix the members to each other.

In one or more embodiments, the header body includes a concave portion. The concave portion is positioned on a side opposite to the second member in the second direction. The second portion has a length in the second direction that is greater than a length of the header body in the second direction. The second portion includes a convex portion. The convex portion is positioned at a tip end of the second portion in the second direction. The second portion engages with the header body as the convex portion engages with the concave portion. Therefore, when assembling the members of the heat exchanger together, it is easier to temporarily fix the members to each other.

DETAILED DESCRIPTION

Hereafter, a heat exchanger 100 according to one or more embodiments of the present disclosure will be described with reference to the drawings. The embodiments described below are specific examples, do not limit the technological scope, and may be modified as appropriate within the sprit and scope of the present disclosure.

A first direction dr1 shown in each figure is the vertical direction in one or more embodiments. A second direction dr2 shown in each figure is a direction crossing the first direction dr1, and is a horizontal direction in one or more embodiments. A third direction dr3 shown in each figure is a direction crossing the first direction dr1 and the second direction dr2, and is a horizontal direction in one or more embodiments. In each figure, each arrow has an arrowhead indicating only one direction. However, the first direction dr1, the second direction dr2, and the third direction dr3 each include a direction opposite to the direction indicated by the arrowhead (that is, a direction that is not indicated by the arrowhead). In the following description, the meaning of the phrase "extend in a direction" is not limited to a case where the extension direction precisely coincides with the direction, and also includes a case where the extension direction is inclined at a predetermined angle with respect to the direction. For example, a case where the extension direction is inclined with respect to a predetermined direction at an angle less than or equal to 45 degrees is interpreted as "extend in the predetermined direction".

(1) Heat Exchanger 100

Figure 1:
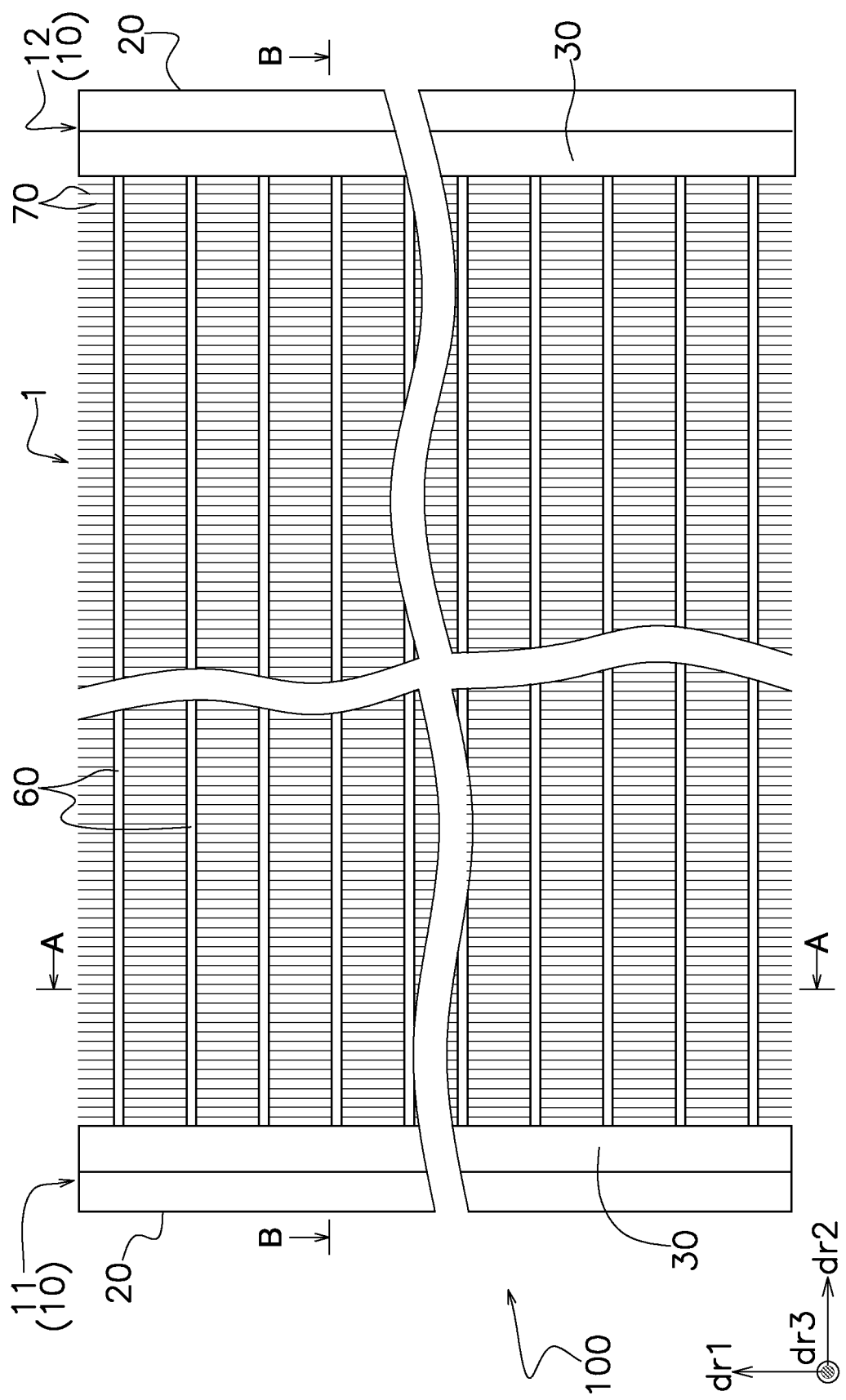
FIG. 1 is a schematic view of a heat exchanger as seen from a third direction according to one or more embodiments.
Figure 2:
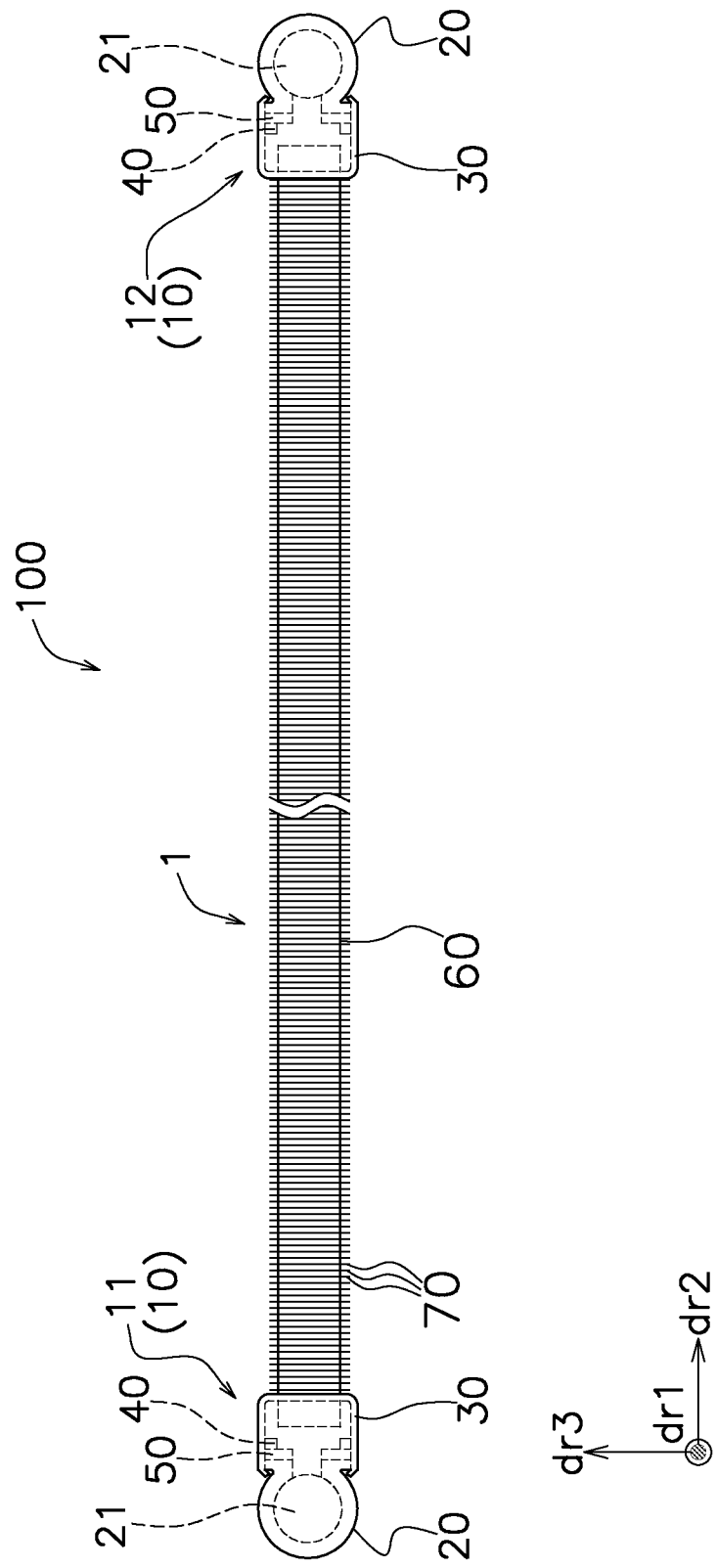
FIG. 2 is a schematic view of a heat exchanger as seen from a first direction according to one or more embodiments.

FIG. 1 is a schematic view of the heat exchanger 100 as seen from the third direction dr3. FIG. 2 is a schematic view of the heat exchanger 100 as seen from the first direction dr1.

The heat exchanger 100 is used for an apparatus that handles a thermal load. For example, the heat exchanger 100 is used for a refrigeration apparatus that performs a refrigeration cycle. For example, the heat exchanger 100 is used for a refrigeration apparatus that performs a refrigeration cycle whose high-pressure side is in a supercritical state. For example, the heat exchanger 100 is used as a heat-source-side heat exchanger and/or a use-side heat exchanger of a refrigeration apparatus. For example, the heat exchanger 100 is used for an air-handling unit.

The heat exchanger 100 is configured to perform heat exchange between a refrigerant and air. The heat exchanger 100 can function as an evaporator that evaporates a refrigerant or as a radiator that releases heat from a refrigerant. Here, the meaning of the term "radiator" includes the meaning of a condenser that condenses a refrigerant. Examples of a refrigerant used in the heat exchanger 100 include a high-pressure refrigerant such as $CO_2$ refrigerant.

Figure 3:
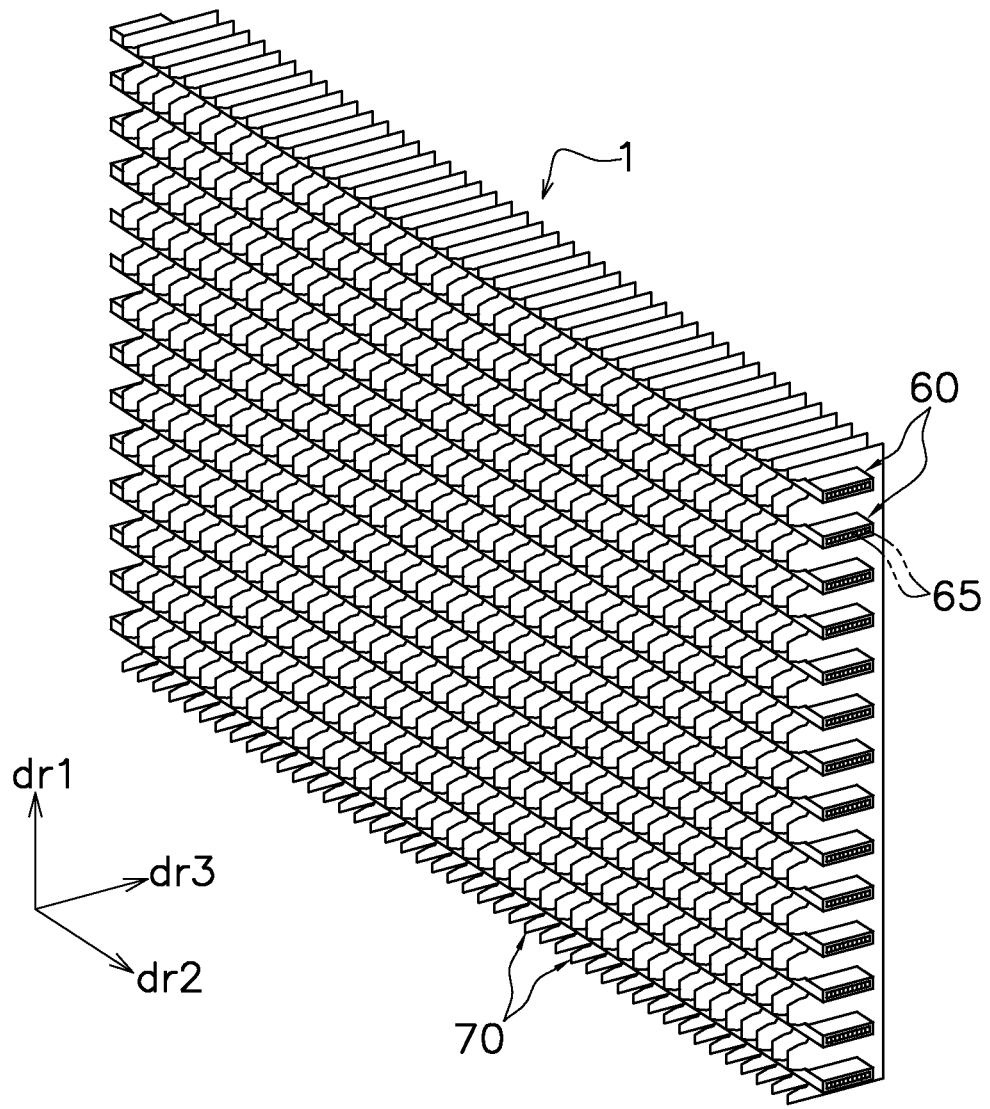
FIG. 3 is a schematic view of a heat exchange unit according to one or more embodiments.

The heat exchanger 100 includes a heat exchange unit 1 between both end portions thereof. FIG. 3 is a schematic view of the heat exchange unit 1. The heat exchange unit 1 occupies the most part of the heat exchanger 100. The heat exchanger 100 performs heat exchange between a refrigerant and air mainly in the heat exchange unit 1. The heat exchanger 100 is configured, for example, so that a refrigerant and air exchange heat when airflow generated by a fan passes through the heat exchange unit 1. The configuration of the heat exchange unit 1 may be changed as appropriate in accordance with design specifications. For example, the heat exchange unit 1 may be configured to extend in a single direction (here, the second direction dr2) as seen from the first direction dr1. Alternatively, the heat exchange unit 1 may be configured to extend in the second direction dr2 as seen from the first direction dr1 and then be bent and extend in the third direction dr3. For example, the heat exchange unit 1 may be substantially I-shaped, substantially L-shaped, substantially U-shaped, or polygonal as seen from the first direction dr1. That is, the heat exchange unit 1 may have a single surface or may have a plurality of surfaces.

The heat exchanger 100 includes a plurality of headers 10, a plurality of heat transfer tubes 60, and a plurality of heat transfer fins 70.

(1-1) Header 10

In a state in which the header 10 is set, the first direction dr1 corresponds to the longitudinal direction of the header 10. That is, the header 10 extends in the first direction dr1. The header 10 is connected to end portions of the plurality of heat transfer tubes 60. The heat exchanger 100 includes a pair of headers 10. To be specific, the heat exchanger 100 includes, as the header 10, a first header 11 and a second header 12.

One of the first header 11 and the second header 12 is disposed at one end of the heat exchanger 100 in the second direction dr2. The other of the first header 11 and the second header 12 is disposed at the other end of the heat exchanger 100 in the second direction dr2. One of the first header 11 and the second header 12 functions as a collecting header that merges refrigerants flowing out from the plurality of heat transfer tubes 60. The other of the first header 11 and the second header 12 functions as a diverting header that distributes refrigerants to the plurality of heat transfer tubes 60.

The first header 11 or the second header 12 corresponds to an inlet header including a refrigerant inlet part of the heat exchanger 100. An inlet pipe (not shown) for feeding a refrigerant to the heat exchanger 100 is connected to the inlet header. The first header 11 or the second header 12 corresponds to an outlet header including a refrigerant outlet part of the heat exchanger 100. An outlet pipe (not shown) for feeding a refrigerant, which flows out of the heat exchanger 100, to another part is connected to the outlet header. Details of the configuration of the header 10 will be described below.

(1-2) Heat Transfer Tube 60

Figure 4:
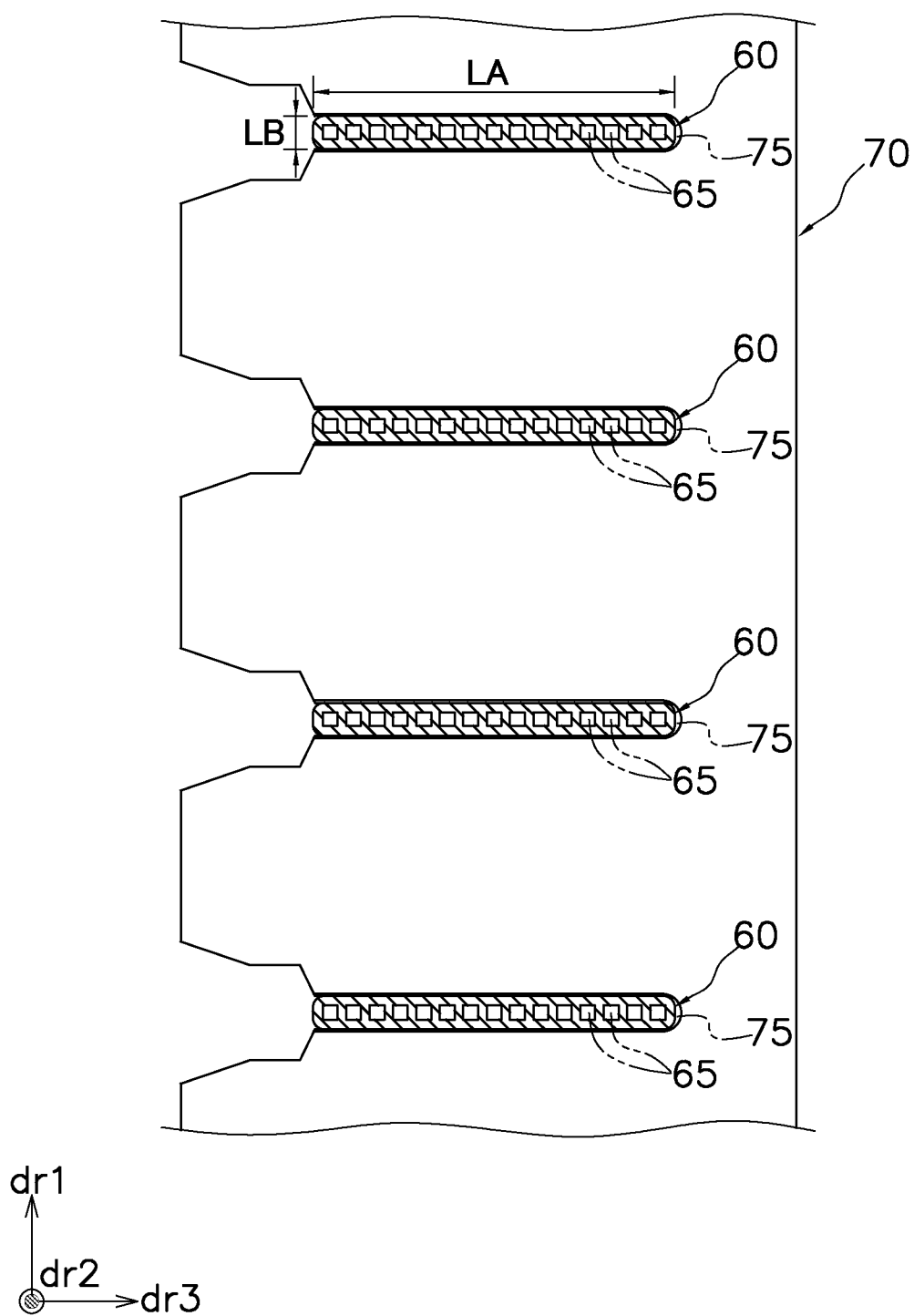
FIG. 4 is a sectional view taken along line A-A of FIG. 1.

FIG. 4 is a sectional view taken along line A-A of FIG. 1. In the heat exchanger 100, the plurality of heat transfer tubes 60 are arranged at intervals in the first direction dr1. In a state in which the heat transfer tube 60 is set, the second direction dr2 corresponds to the longitudinal direction. That is, the heat transfer tube 60 extends in the second direction dr2. In one or more embodiments, the heat transfer tube 60 is a flat tube having a flat shape. In a state in which the heat transfer tube 60 is set, the first direction dr1 corresponds to the thickness direction and the third direction dr3 corresponds to the width direction. The heat transfer tube 60 has a width having a length LA. The heat transfer tube 60 has a thickness having a length LB. One end of each heat transfer tube 60 is connected to the first header 11. The other end of each heat transfer tube 60 is connected to the second header 12.

A refrigerant flows through the inside of the heat transfer tube 60. In the heat transfer tube 60, a flow path 65 extending from one end to the other end in the longitudinal direction is formed. In each heat transfer tube 60, a plurality of flow paths 65 are formed. In each heat transfer tube 60, the plurality of flow paths 65 are arranged in the width direction. That is, the heat transfer tube 60 is a so-called flat multi-hole tube. In one or more embodiments, the heat transfer tube 60 is made of aluminum or an aluminum alloy. Each flow path 65 of the heat transfer tube 60 communicates with the space in the header 10.

(1-3) Heat Transfer Fin 70

The heat transfer fin 70 is a member that accelerates heat exchange between air and a refrigerant in the heat transfer tube 60. The heat transfer fin 70 is a plate-shaped member that increases the heat exchange area in which the heat transfer tube 60 and air exchanges heat. In a state in which the heat transfer fin 70 is set, the first direction dr1 corresponds to the longitudinal direction. That is, the heat transfer fin 70 extends in the longitudinal direction of the header 10. The heat transfer fin 70 extends also in a direction crossing the longitudinal direction of the heat transfer tube 60.

A plurality of cutouts 75 are formed in the heat transfer fin 70. The plurality of cutouts 75 are arranged in the heat transfer fin 70 at intervals in the longitudinal direction. Each cutout 75 extends in the width direction of the heat transfer tube 60. The heat transfer tube 60 is inserted into each cutout 75 of the heat transfer fin 70. The heat transfer fin 70 is in contact with the heat transfer tube 60 at an edge portion of each cutout 75. The heat transfer fin 70 is made of aluminum or an aluminum alloy.

(2) Details of Header 10

Hereafter, details of the header 10 will be described. Unless otherwise noted, the following description applies to both of the first header 11 and the second header 12.

(2-1) Configuration of Header 10

Figure 5:
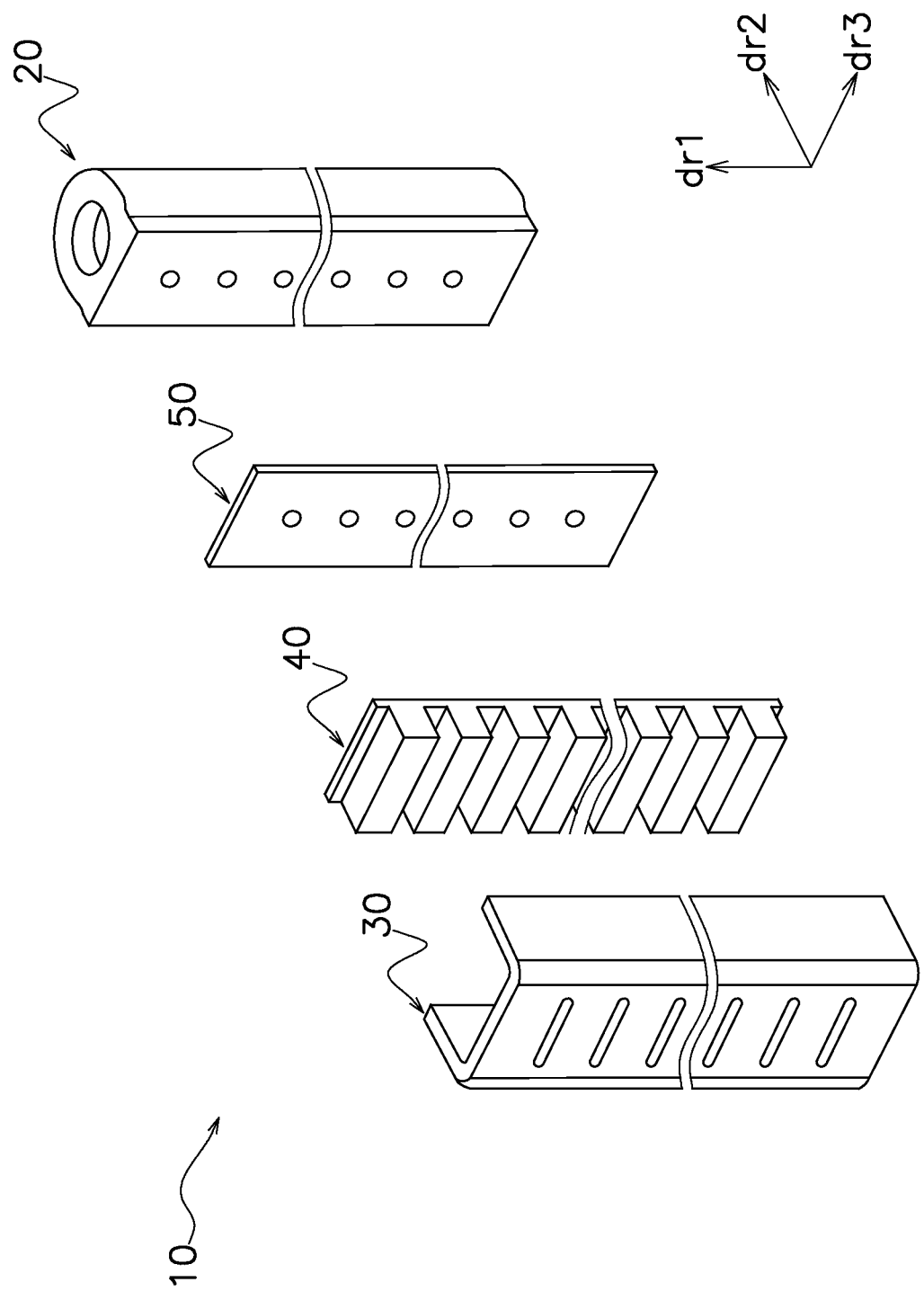
FIG. 5 is an exploded schematic view of a header according to one or more embodiments.
Figure 6:
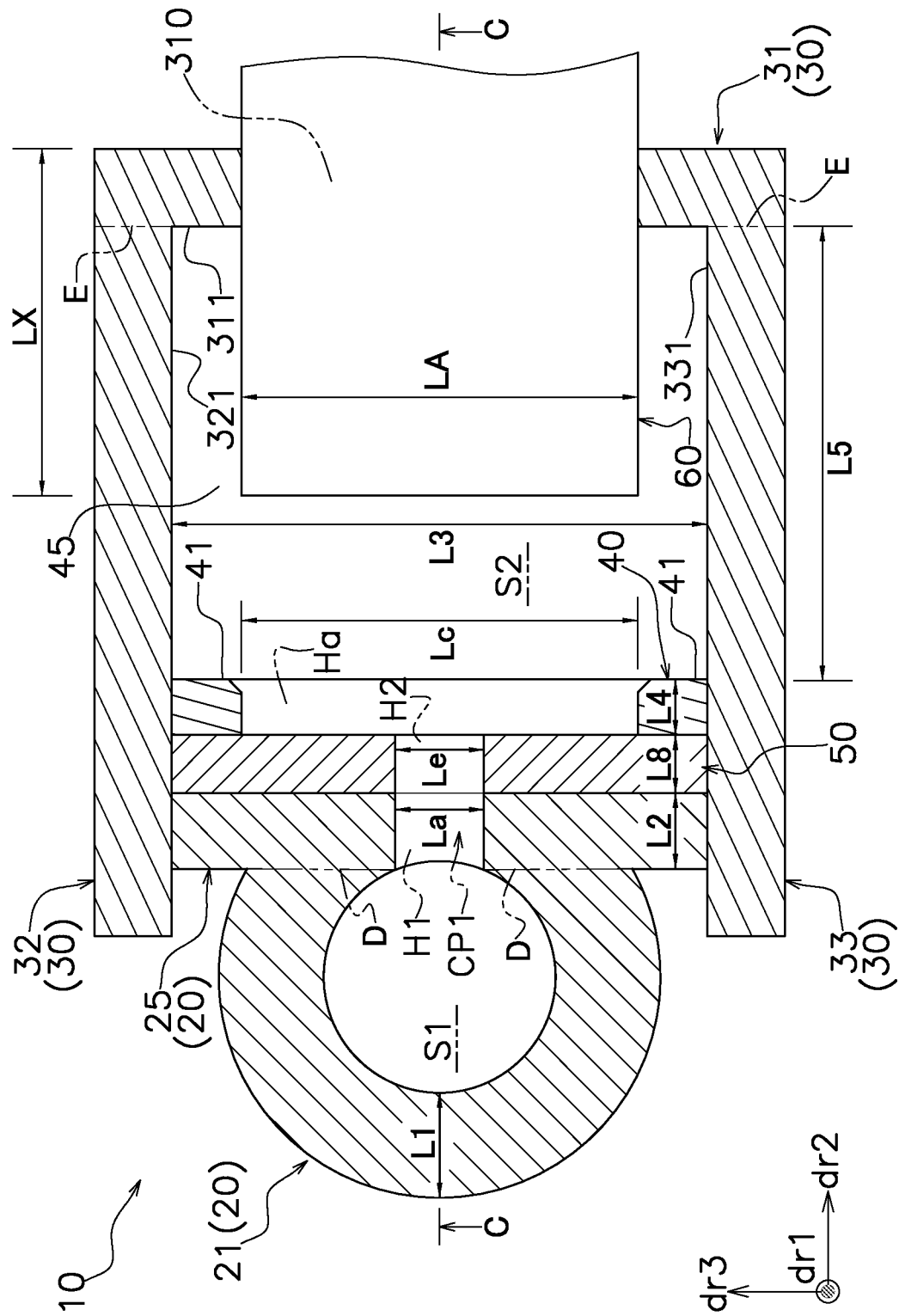
FIG. 6 is a sectional view taken along line B-B of FIG. 1.
Figure 7:
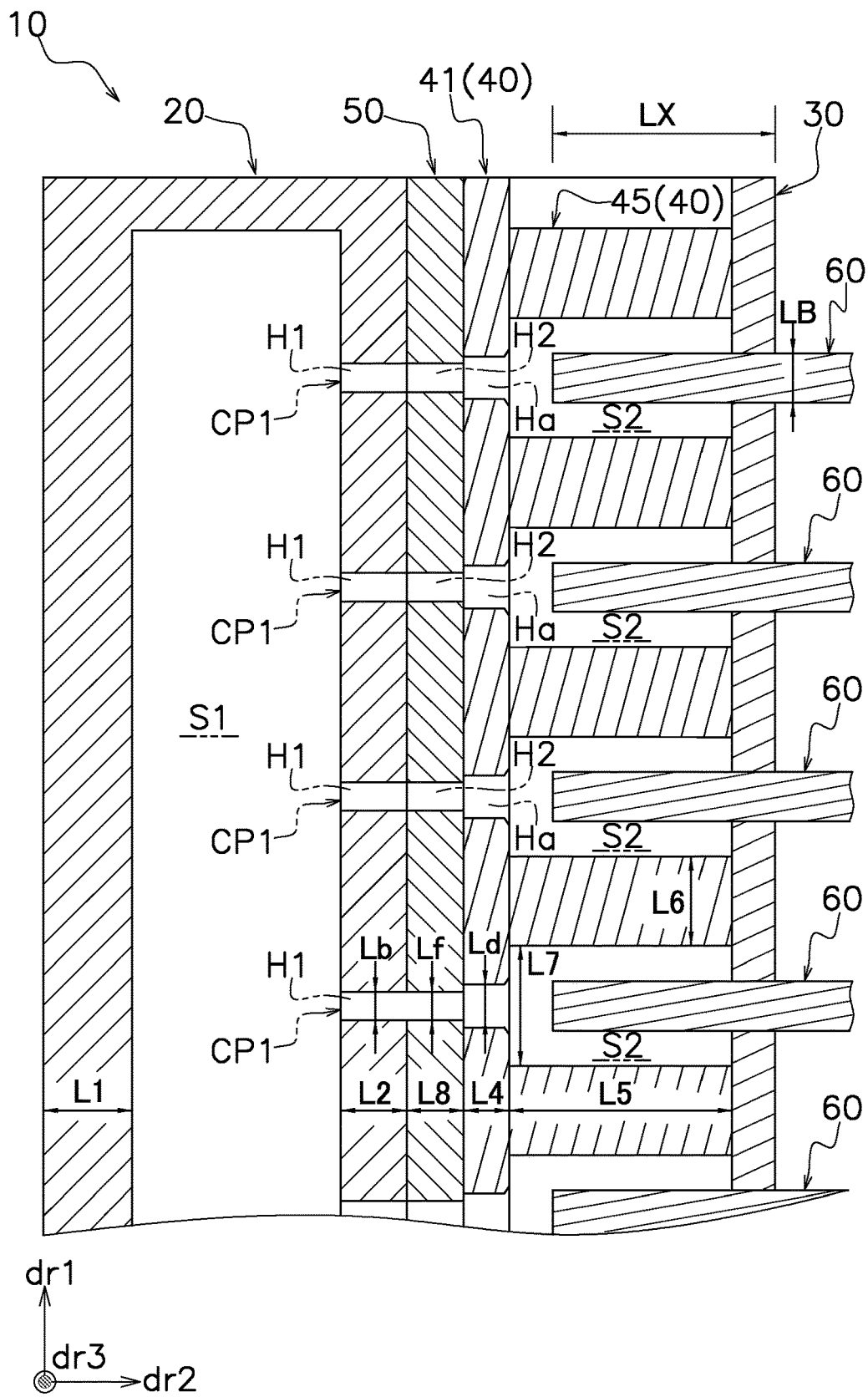
FIG. 7 is a sectional view taken along line C-C of FIG. 6.

FIG. 5 is an exploded schematic view of the header 10. FIG. 6 is a sectional view taken along line B-B of FIG. 1. FIG. 7 is a sectional view taken along line C-C of FIG. 6. The header 10 mainly includes a header body 20, a header first member 30, a header second member 40, and a header third member 50. The header 10 is formed by joining the header body 20, the header first member 30, the header second member 40, and the header third member 50. These constituent members of the header 10 are made of aluminum or an aluminum alloy. In a completed state, the longitudinal direction of each of these members is the first direction dr1. Here, the meaning of the term "join" includes the meaning that members are fixed to each other by brazing.

(2-1-1) Header Body 20

Figure 8:
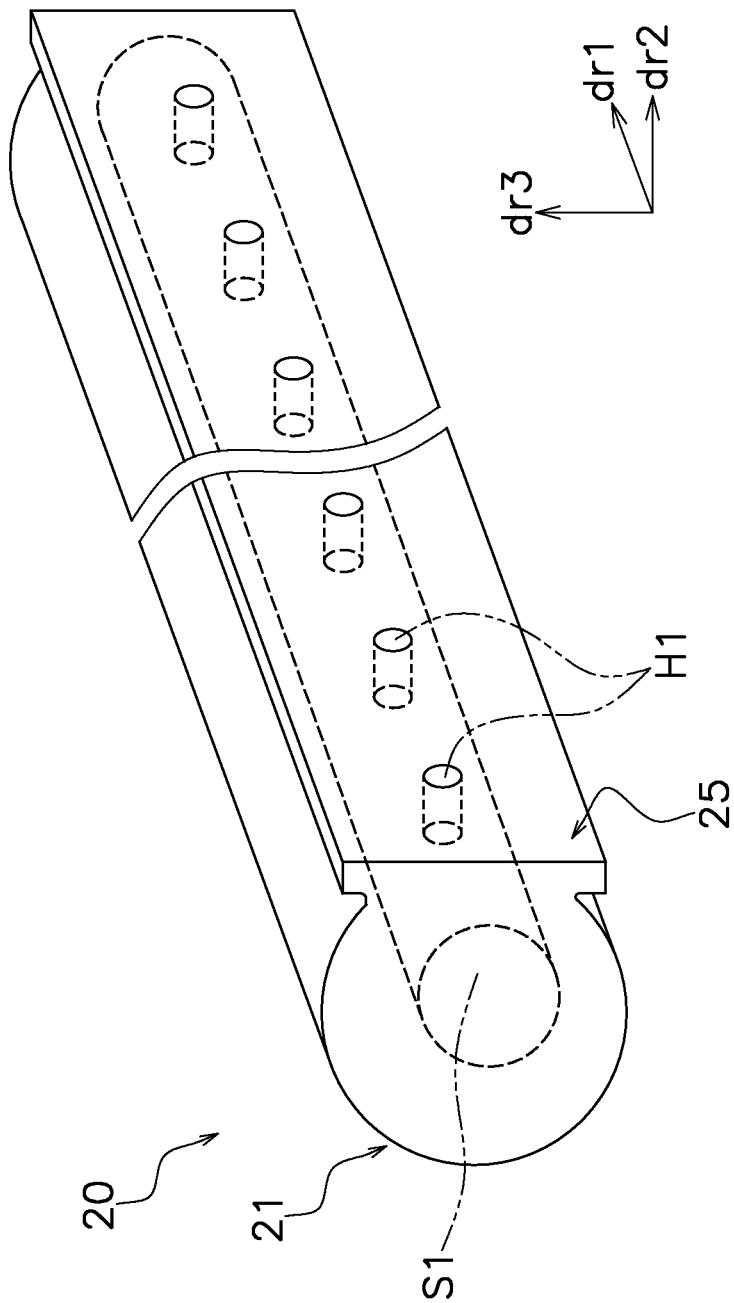
FIG. 8 is a schematic view of a header body according to one or more embodiments.

FIG. 8 is a schematic view of the header body 20. The header body 20 is a member having a tubular shape. The longitudinal direction of the header body 20 corresponds to the first direction dr1. That is, the header body 20 extends in the first direction dr1. The header body 20 is substantially cylindrical. To be more specific, the header body 20 has a substantially Ω-shaped cross section. A cylindrical space (a body inner space S1) is formed in the header body 20. The body inner space S1 extends in the longitudinal direction of the header 10.

A plurality of through holes (first holes H1) are formed in the header body 20. The first hole H1 is a hole that allows the body inner space S1 and a heat-transfer-tube insertion space S2, which is formed by the header first member 30 and the header second member 40, to communicate with each other. That is, the first hole H1 forms a communication flow path CP1 through which the body inner space S1 and the heat-transfer-tube insertion space S2 (first space) communicate with each other. The first hole H1 extends in the second direction dr2 between the body inner space S1 and the heat-transfer-tube insertion space S2. In the header body 20, the first holes H1 are arranged at intervals in the first direction dr1. The first hole H1 is substantially circular as seen from the second direction dr2.

The header body 20 mainly includes a body portion 21 and a communication portion 25. The body portion 21 and the communication portion 25 are integrally formed. Although there is no clear boundary between the body portion 21 and the communication portion 25, for convenience of description, a part positioned on the heat exchange unit 1 side with respect to a two-dot chain line D of FIG. 6 is defined as the communication portion 25 and a part positioned on the opposite side is defined as the body portion 21. That is, the body portion 21 is positioned on the opposite side of the heat transfer tube 60 relative to the communication portion 25.

The body portion 21 has a substantially C-shaped cross section (see FIG. 6). The body inner space S1 is mainly formed inside of the body portion 21. In other words, the body inner space S1 is formed by the body portion 21. The thickness of the body portion 21 extends in the radial direction of the body inner space S1 (the radial direction from the center of the body inner space S1). The body portion 21 has a thickness having a length L1. In one or more embodiments, the length L1 is 5 mm.

As described above, an inlet pipe (not shown) for feeding a refrigerant to the heat exchanger 100 is connected to the header 10, which is the inlet header. The inlet pipe is connected to the body portion 21. An outlet pipe (not shown) for feeding a refrigerant, which flows out from the heat exchanger 100, to another part is connected to the header 10, which is the outlet header. The outlet pipe is connected to the body portion 21. A hole for connecting the inlet pipe and/or the outlet pipe is formed, for example, in a top part or a bottom part of the body portion 21 or on a side opposite to the communication portion 25.

The communication portion 25 is substantially I-shaped as seen from the first direction dr1 (see FIG. 6). The plurality of first holes H1 are formed in the communication portion 25. The thickness of the communication portion 25 extends in the second direction dr2. The communication portion 25 has a thickness having a length L2. In one or more embodiments, the length L2 is 3 mm. The communication portion 25 extends in the third direction dr3 as seen from the first direction dr1. In other words, the width of the communication portion 25 extends in the third direction dr3. The communication portion 25 has a width having a length L3. The length L3 is greater than the length LA of the heat transfer tube 60 in the width direction. In one or more embodiments, the length L3 is 8 mm.

The plurality of first holes H1 are arranged in the communication portion 25 at intervals in the first direction dr1. The first hole H1 extends in the second direction dr2 through the communication portion 25. One end of each first hole H1 communicates with the body inner space S1. The other end of the first hole H1 communicates with a second hole H2 formed in the header third member 50. The length of the first hole H1 in the third direction dr3 corresponds to a length La (see FIG. 6). The length of the first hole H1 in first direction dr1 corresponds to a length Lb (see FIG. 7).

(2-1-2) Header First Member 30 (First Member)

Figure 9:
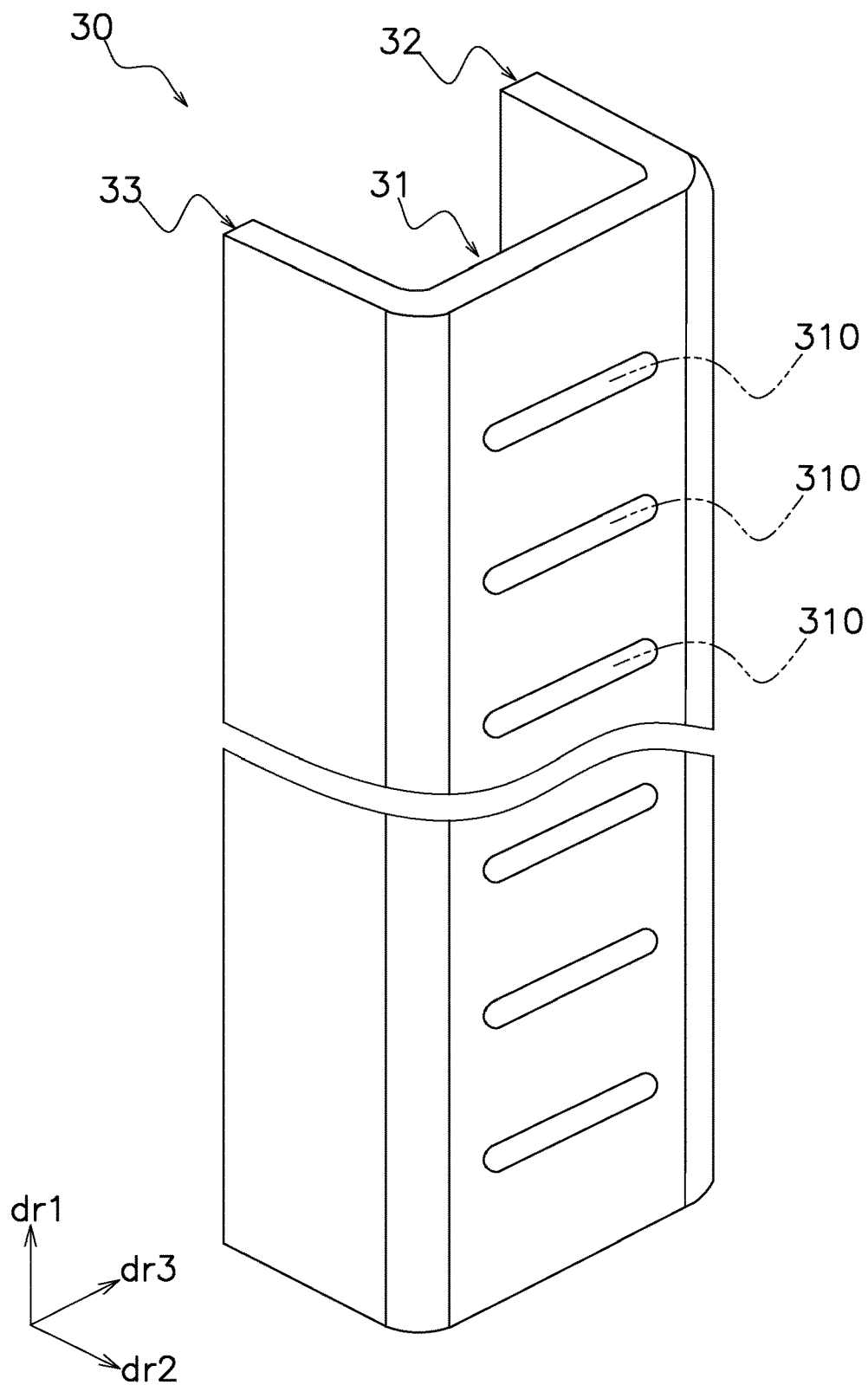
FIG. 9 is a schematic view of a header first member according to one or more embodiments.

FIG. 9 is a schematic view of the header first member 30. The header first member 30 is a plate-shaped part having the longitudinal direction in the first direction dr1. That is, the header first member 30 is a member that extends in the first direction dr1. The header first member 30 is substantially U-shaped as seen from the first direction dr1. An end portion of each heat transfer tube 60 is inserted into the header first member 30. It can be said that the header first member 30 is a member that surrounds a tip end of the heat transfer tube 60. The header first member 30 forms, inside thereof, the heat-transfer-tube insertion space S2 together with the header second member 40. In other words, the header first member 30 covers the heat-transfer-tube insertion space S2. The header first member 30 is made of a so-called cladding material and includes a brazing material on the surface side. In relation to this, the header first member 30 functions as a joining member that joins some or all of the header body 20, the header second member 40, the header third member 50, and each heat transfer tube 60.

The header first member 30 mainly includes a first surrounding portion 31, a second surrounding portion 32, and a third surrounding portion 33. The first surrounding portion 31, the second surrounding portion 32, and the third surrounding portion 33 are integrally formed. Although there is no clear boundary between the first surrounding portion 31, the second surrounding portion 32 and the third surrounding portion 33, for convenience of description, a part positioned on the heat exchange unit 1 side with respect to a two-dot chain line E in FIG. 6 is defined as the first surrounding portion 31 and parts positioned on the opposite side are defined as the second surrounding portion 32 and the third surrounding portion 33.

The first surrounding portion 31 (a first portion) has the longitudinal direction in the first direction dr1. The first surrounding portion 31 extends in the third direction dr3 as seen from the first direction dr1. The first surrounding portion 31 is a plate-shaped part. The thickness of the first surrounding portion 31 extends in the second direction dr2. The first surrounding portion 31 has a main surface facing in the second direction dr2. The main surface of the first surrounding portion 31 is positioned closest to the heat exchange unit 1 side in the header 10. In other words, the first surrounding portion 31 is positioned closer to the heat transfer tube 60 side than the other members. In the first surrounding portion 31, a plurality of heat-transfer-tube insertion holes 310, into which end portions of the heat transfer tubes 60 are inserted, are formed. The plurality of heat-transfer-tube insertion holes 310 are arranged in the header first member 30 at intervals in the first direction dr1. The heat-transfer-tube insertion hole 310 has a shape that traces the shape of the heat transfer tube 60 as seen from the second direction dr2. One end of each of the plurality of heat transfer tubes 60 extends through the first surrounding portion 31 via the heat-transfer-tube insertion hole 310. The first surrounding portion 31 engages the heat transfer tube at an edge portion of the heat-transfer-tube insertion hole 310. In other words, the first surrounding portion 31 supports one end side of the heat transfer tube 60. The second surrounding portion 32 and the third surrounding portion 33 extend in the second direction dr2 from both ends of the first surrounding portion 31 in the transversal direction (here, the third direction dr3).

The second surrounding portion 32 has the longitudinal direction in the first direction dr1. The second surrounding portion 32 is connected to one end side of the first surrounding portion 31 as seen from the first direction dr1 and extends toward the header body 20 side in the second direction dr2. The second surrounding portion 32 is a plate-shaped part. The thickness of the second surrounding portion 32 extends in the third direction dr3. The second surrounding portion 32 is positioned outside of one end of the heat transfer tube 60 in the third direction dr3. The second surrounding portion 32 has a main surface facing in the third direction dr3. The second surrounding portion 32 is joined, inside thereof, to the header body 20, the header second member 40, and the header third member 50.

The third surrounding portion 33 has the longitudinal direction in the first direction dr1. The third surrounding portion 33 is connected to the other end side of the first surrounding portion 31 as seen from the first direction dr1 and extends toward the header body 20 side in the second direction dr2. The third surrounding portion 33 is a plate-shaped part. That is, the thickness of the third surrounding portion 33 extends in the third direction dr3. The third surrounding portion 33 is positioned outside of the other end of the heat transfer tube 60 in the third direction dr3. The third surrounding portion 33 is positioned on a side opposite to the second surrounding portion 32 with protruding portions 45 (described below) of the header second member 40 therebetween. The third surrounding portion 33 has a main surface facing in the third direction dr3. The third surrounding portion 33 is joined, inside thereof, to the header body 20, the header second member 40, and the header third member 50.

A clearance is left between the heat transfer tube 60 inserted into the heat-transfer-tube insertion space S2, and the second surrounding portion 32 and the third surrounding portion 33. In relation to this, in the brazing step, the brazing material is prevented from flowing from the second surrounding portion 32 and the third surrounding portion 33 to an end of the heat transfer tube 60. Thus, the flow path 65 of the heat transfer tube 60 is prevented from becoming blocked by the brazing material.

(2-1-3) Header Second Member 40 (Second Member)

Figure 10:
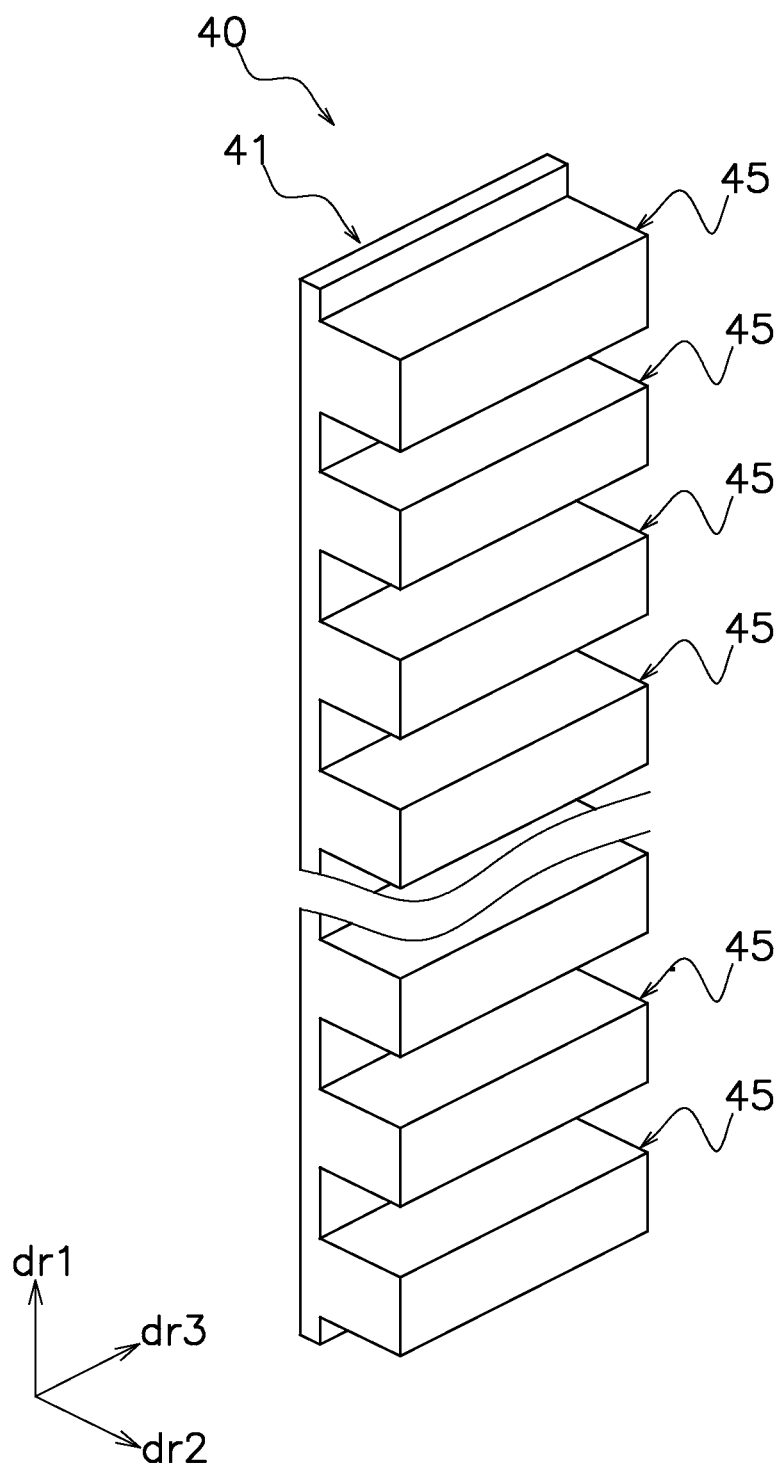
FIG. 10 is a schematic view of a header second member according to one or more embodiments.
Figure 11:
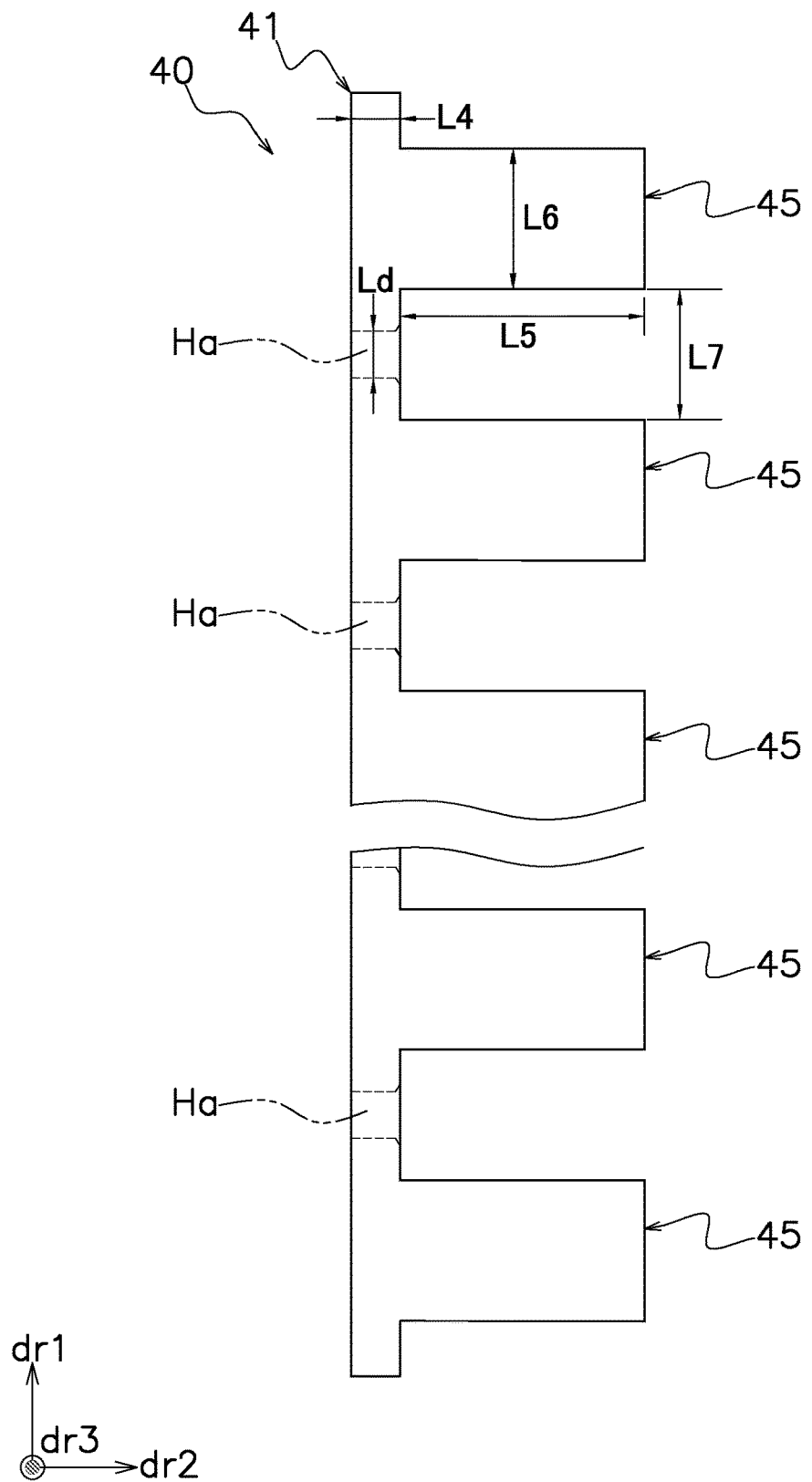
FIG. 11 is a schematic view of the header second member as seen from the third direction according to one or more embodiments.
Figure 12:
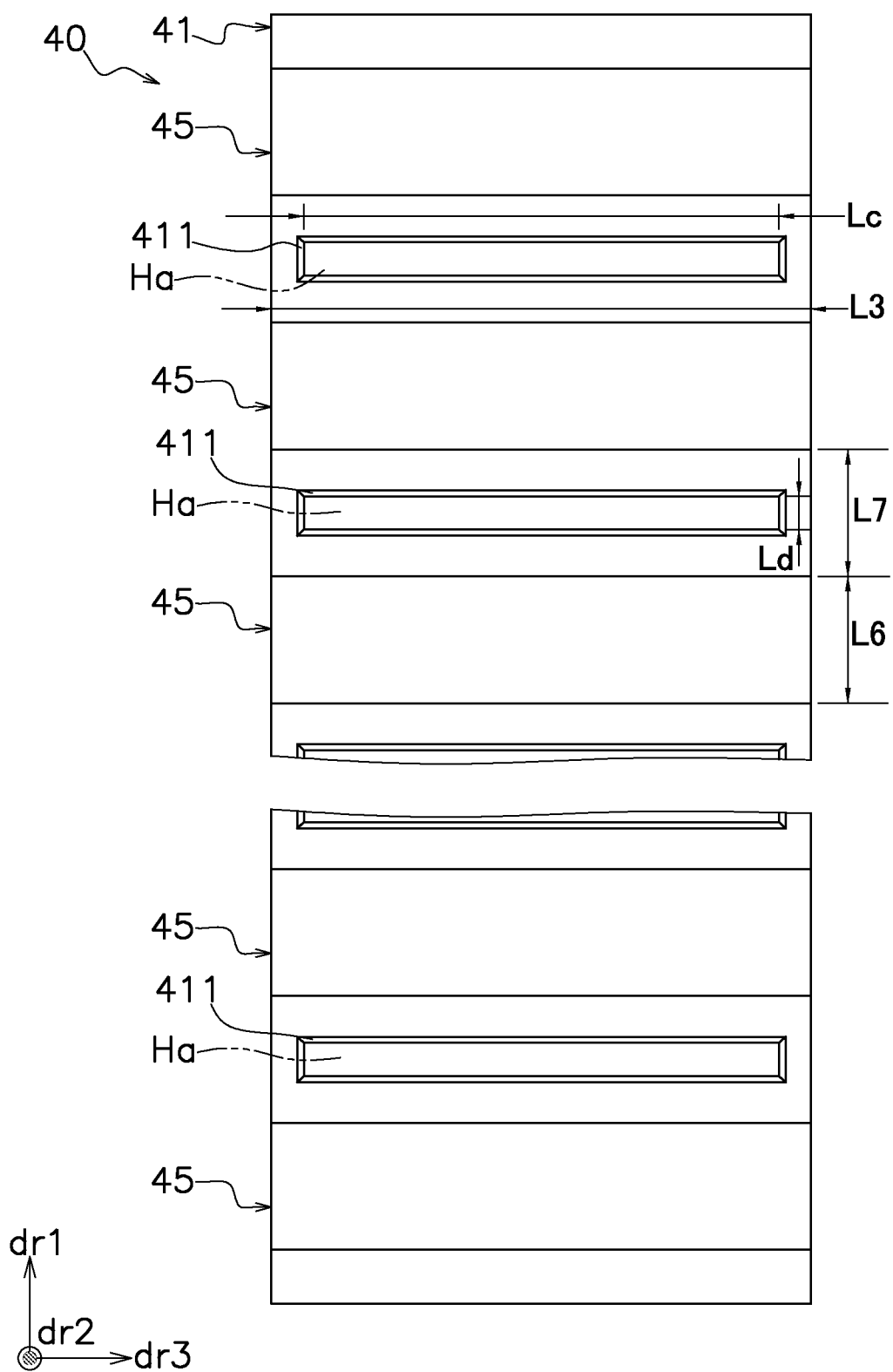
FIG. 12 is a schematic view of the header second member as seen from the heat exchange unit side according to one or more embodiments.

FIG. 10 is a schematic view of the header second member 40. FIG. 11 is a schematic view of the header second member 40 as seen from the third direction dr3. FIG. 12 is a schematic view of the header second member 40 as seen from the heat exchange unit 1 side.

The header second member 40 is positioned between the header body 20 and the header first member 30. To be more specific, the header second member 40 is positioned between the header third member 50 and the first surrounding portion 31 of the header first member 30. As illustrated in FIGS. 10 to 12, the header second member 40 has a ladder-like shape. In other words, the header second member 40 is shaped like a heat sink having heat radiation fins for cooling a heat-generating component. The header second member 40 includes a base portion 41 and a plurality of protruding portions 45. The base portion 41 and the protruding portions 45 are integrally formed. Although there is no clear boundary between the base portion 41 and the protruding portions 45, for convenience of description, a flat plate-shaped part is defined as the base portion 41 and parts that protrude toward the heat exchange unit 1 side are defined as the protruding portions 45.

The base portion 41 is a plate-shaped part having the longitudinal direction in the first direction dr1. That is, the base portion 41 is a member that extends in the first direction dr1. The base portion 41 extends in the third direction dr3 as seen from the first direction dr1. In other words, the width of the base portion 41 extends in the third direction dr3. The length of the base portion 41 in the width direction is substantially the same as the length of the communication portion 25 in the width direction. That is, the base portion 41 has a width having the length L3. The thickness of the base portion 41 extends in the second direction dr2. The base portion 41 has a thickness having a length L4. The length L4 is 2 mm A through hole (a communication hole Ha) is formed in the base portion 41.

The communication hole Ha is a hole that allows the communication flow path CP1, which is connected to the body inner space S1, and the heat-transfer-tube insertion space S2 to communicate with each other. The communication hole Ha extends in the second direction dr2 between the body inner space S1 and the heat-transfer-tube insertion space S2. To be more specific, a plurality of communication holes Ha are formed in the base portion 41. The number of communication holes Ha is the same as the number of heat transfer tubes 60 inserted into the header first member 30. The plurality of communication holes Ha are arranged in the base portion 41 at intervals in the first direction dr1. The communication hole Ha extends in the second direction dr2 through the base portion 41. The length of the communication hole Ha in the third direction dr3 corresponds to a length Lc (see FIG. 6). The length Lc is greater than the length La or Le (described below). The length of the communication hole Ha in the first direction dr1 corresponds to a length Ld (see FIG. 7). The length Ld is greater than the length Lb or Lf (described below). One end of the communication hole Ha communicates with the communication flow path CP1. The other end of the communication hole Ha communicates with the heat-transfer-tube insertion space S2 formed in the header first member 30. That is, the communication hole Ha allows the body inner space S1 and the heat-transfer-tube insertion space S2 to communicate with each other via the communication flow path CP1. The communication hole H is substantially rectangular as seen from the heat exchange unit 1 side. As seen from the second direction dr2, the area of the communication hole Ha is greater than the total area of the flow paths 65 formed in one heat transfer tube 60. In other words, the area of the communication hole Ha is greater than the cross-sectional area of a refrigerant flow paths formed in the heat transfer tube 60.

In a surface of the base portion 41 on the heat exchange unit 1 side, an edge part (an edge portion 411) of the communication hole Ha is chamfered. That is, a part of the edge portion 411 that forms the communication hole Ha of the base portion 41, the part being positioned on the heat transfer tube 60 side, is chamfered. To be more specific, the edge portion 411 is chamfered in such a way that, from the heat exchange unit 1 side toward the header body 20 side, the edge portion 411 becomes narrower than the length LA in the width direction and/or the length LB in the thickness direction of the heat transfer tube 60. In relation to this, a tip end of the heat transfer tube 60 cannot enter into the body inner space S1 side further than the edge portion 411. As a result, during assembly of the heat exchanger 100, it is possible to perform positioning by pressing the tip end of the heat transfer tube 60, which is inserted into the heat-transfer-tube insertion space S2, against the edge portion 411. Therefore, during assembly, it is easier to make the insertion length of the heat transfer tubes 60 uniform.

The protruding portion 45 is a part that protrudes from the base portion 41 toward the heat exchange unit 1 side in the second direction dr2. To be more specific, the protruding portion 45 extends from the base portion 41 toward an inner surface 311 of the first surrounding portion 31 of the header first member 30 in the second direction dr2. In a state of being set, the protruding portions 45 are adjacent to each other and are arranged outside of the heat transfer tube 60 in the first direction dr1 at intervals. To be more specific, each protruding portion 45 is disposed in such a way that an end portion of the heat transfer tube 60 is interposed between the protruding portion 45 and another protruding portion 45 that is adjacent thereto in the first direction dr1 via a gap.

The protruding portion 45 extends in the second direction dr2 as seen from the first direction dr1. That is, the protruding direction (extension direction) of the protruding portion 45 is the second direction dr2. The protruding portion 45 has a length L5 in the second direction dr2. In one or more embodiments, the length L5 is 7 mm That is, the length of the protruding portion 45 in the second direction dr2 is greater than or equal to 2 mm. The length of the protruding portion 45 in the second direction dr2 is greater than or equal to twice the length L4 of the base portion 41 in the width direction (the second direction dr2).

The width of the protruding portion 45 extends in the third direction dr3. In one or more embodiments, the length of the protruding portion 45 in the width direction is substantially the same as the length of the base portion 41 in the width direction. That is, the protruding portion 45 has a width having the length L3. As described above, the length L3 is greater than the length LA of the heat transfer tube 60 in the width direction. That is, the width of the protruding portion 45 is greater than the width of the heat transfer tube 60. The thickness of the protruding portion 45 extends in the first direction dr1. The protruding portion 45 has a thickness having a length L6. The length L6 is greater than the length L4. That is, the thickness of the base portion 41 is less than the thickness of the protruding portion 45. In one or more embodiments, the length L6 is 4 mm. In other words, the thickness (L6) of the protruding portion 45 is greater than or equal to twice the thickness (L4) of the base portion 41.

Each protruding portion 45 is adjacent to another protruding portion 45 at an interval corresponding to a length L7 in the first direction dr1. That is, the protruding portions 45 are arranged in the base portion 41 at intervals corresponding to the length L7 in the first direction dr1. In one or more embodiments, the length L7 is 4 mm That is, in one or more embodiments, the plurality of protruding portions 45 are arranged in the first direction dr1 at intervals greater than or equal to 1 mm.

Each protruding portion 45 is in contact with the header first member 30. In one or more embodiments, each protruding portion 45 is joined to the header first member 30. To be more specific, a tip end part of each protruding portion 45 is joined to the inner surface 311 of the first surrounding portion 31. A part of each protruding portion 45 facing in the third direction dr3 is joined to an inner surface 321 of the second surrounding portion 32 or an inner surface 331 of the third surrounding portion 33.

The header second member 40, which includes such protruding portions 45, functions as a partitioning member that divides the space in the header 10 into a plurality of spaces (heat-transfer-tube insertion spaces S2). That is, in the header 10, because the plurality of protruding portions 45 are arranged at intervals in the first direction dr1, a plurality of heat-transfer-tube insertion spaces S2 are arranged in the first direction dr1. That is, the header second member 40 is a member for forming a plurality of spaces in the header 10.

The header second member 40 also functions as a spacer member that provides an appropriate insertion length of the heat transfer tube 60 inserted into the header first member 30. That is, because the protruding portion 45, which extends from the base portion 41 toward the first surrounding portion 31 of the header first member 30 in the second direction dr2, is provided, the first surrounding portion 31 and the base portion 41 are prevented from becoming close to each other, and a space corresponding to the length L5 is formed between the first surrounding portion 31 and the base portion 41. In relation to this, when the heat transfer tube 60 is inserted into the header first member 30, an appropriate insertion length is provided. As a result, extraction of the heat transfer tube 60 inserted into the header first member 30 is prevented. In particular, when the heat exchanger 100 is brazed in a furnace, extraction of the end portion of the heat transfer tube 60 from the header first member 30 due to thermal expansion or thermal contraction is prevented. FIGS. 6 and 7 illustrate a state in which, in the header 10 in a completed state, an insertion length having a length LX of the heat transfer tube 60 is provided.

In relation to the fact that an appropriate insertion length of the heat transfer tube 60 is provided, a tip end part of the heat transfer tube 60 inserted into the heat-transfer-tube insertion space S2 is suppressed from becoming close to a member including a brazing material (here, the header first member 30 or the header third member 50). Therefore, in the brazing step, the brazing material is not likely to reach the tip end part of the heat transfer tube 60. As a result, the flow path 65 of the heat transfer tube 60 is prevented from becoming blocked by the brazing material.

(2-1-4) Header Third Member 50 (Brazing Material)

Figure 13:
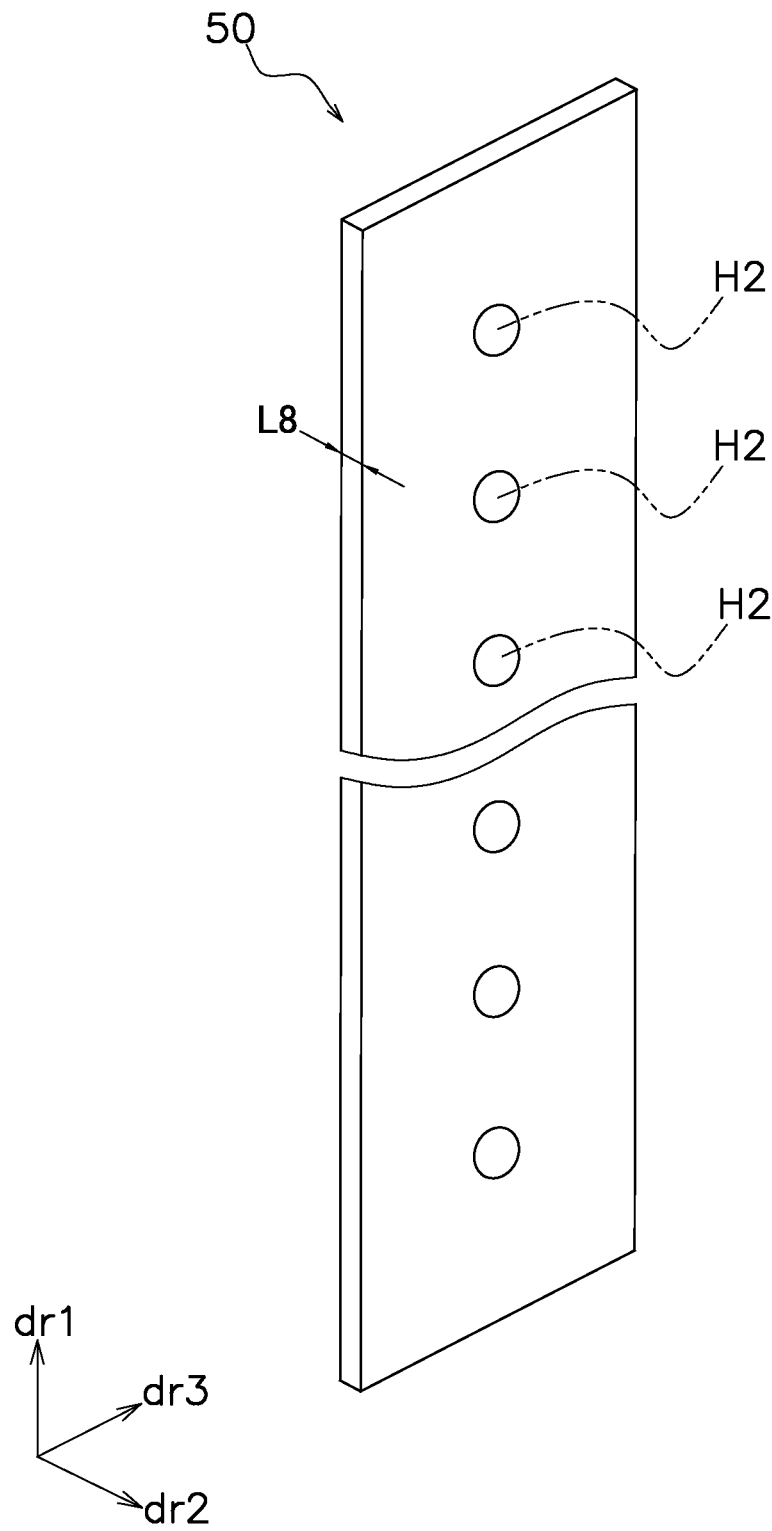
FIG. 13 is a schematic view of a header third member according to one or more embodiments.

FIG. 13 is a schematic view of the header third member 50. The header third member 50 is a plate-shaped part having the longitudinal direction in the first direction dr1. That is, the header third member 50 extends in the first direction dr1. The header third member 50 is positioned between the header body 20 and the header second member 40. The header third member 50 is made of a so-called cladding material and includes a brazing material on the surface side. In relation to this, the header third member 50 functions as a joining member that joins the header body 20 and the base portion 41 of the header second member 40. In other words, the brazing material is disposed between the header body 20 and the base portion 41.

The header third member 50 extends in the third direction dr3 as seen from the first direction dr1. In other words, the width of the header third member 50 extends in the third direction dr3. The length of the header third member 50 in the width direction is substantially the same as the length of the communication portion 25 of the header body 20 in the width direction. That is, the header third member 50 has a width having the length L3. The thickness of the header third member 50 extends in the second direction dr2. The header third member 50 has a thickness having a length L8. In one or more embodiments, the length L8 is 2.5 mm A plurality of through holes (second holes H2) are formed in the header third member 50.

The second hole H2 is a hole that allows, together with the first hole H1, the body inner space S1 and the heat-transfer-tube insertion space S2, which is formed by the header first member 30 and the header second member 40, to communicate with each other. That is, the second hole H2 forms the communication flow path CP1 together with the first hole H1. The second hole H2 extends in the second direction dr2 between the body inner space S1 and the heat-transfer-tube insertion space S2. In the header third member 50, the second holes H2 are arranged at intervals in the first direction dr1. The second hole H2 extends in the second direction dr2 through the header third member 50. One end of the second hole H2 communicates with the first hole H1. The other end of the second hole H2 communicates with the communication hole Ha formed in the header second member 40. The length of the second hole H2 in the third direction dr3 corresponds to the length Le (see FIG. 6). The length of the second hole H2 in the first direction dr1 corresponds to the length Lf (see FIG. 7). The second hole H2 has the same size and the same shape as the first hole H1 as seen from the second direction dr2. That is, as with the first hole H1, the second hole H2 is substantially circular as seen from the second direction dr2. The length La of the first hole H1 in the third direction dr3 and the length Le of the second hole H2 in the third direction dr3 are equal. The length Lb of the first hole H1 in first direction dr1 and the length Lf of the second hole H2 in the third direction dr3 are equal. Therefore, the pressure resistance of the header 10 is improved. Here, the meaning of the term "equal" includes not only the meaning of "completely equal" but also the meaning of "substantially equal" with a predetermined tolerance. For example, when the size and magnitude of the second hole H2 coincide with those of the first hole H1 by 80 percent or more as seen from the second direction dr2, the second hole H2 has the same size and the same shape as the first hole H1 as seen from the second direction dr2.

The second hole H2 overlaps a corresponding first hole H1 as seen from the second direction dr2. To be more specific, the position of the second hole H2 is the same as the position of the corresponding first holes H1 as seen from the second direction dr2. Here, the meaning of the term "the same" includes not only the meaning of "completely the same" but also the meaning of "substantially the same" with a predetermined tolerance. For example, when the position of the second hole H2 coincides with that of the first hole H1 by 80 percent or more as seen from the second direction dr2, the second hole H2 is disposed at the same position as the first hole H1 as seen from the second direction dr2.

The header third member 50 is in contact with the communication portion 25 of the header body 20 and the base portion 41 of the header second member 40. In one or more embodiments, a surface of the header third member 50 on the header body 20 side is joined to the communication portion 25. A surface of the header third member 50 on the heat exchange unit 1 side is joined to the base portion 41 of the header second member 40.

(2-2) Space in Header 10

As described above, the body inner space S1, which has a cylindrical shape and extends in the first direction dr1, is formed in the header body 20 of the header 10. The body inner space S1 communicates with the plurality of first holes H1. That is, the body inner space S1 communicates with a plurality of communication flow paths CP1. When an inlet pipe and/or an outlet pipe is connected to the header body 20, the body inner space S1 communicates with the inlet pipe and/or the outlet pipe.

The plurality of heat-transfer-tube insertion spaces S2 are formed in the header 10. Each heat-transfer-tube insertion space S2 is formed by being surrounded by the header first member 30 and the header second member 40. To be more specific, the heat-transfer-tube insertion space S2 is a space surrounded by the base portion 41, the protruding portions 45 that are adjacent to each other, and the inner surface 311 of the first surrounding portion 31, the inner surface 321 of the second surrounding portion 32, and the inner surface 331 of the third surrounding portion 33 of the header first member 30. In the header 10, the plurality of heat-transfer-tube insertion spaces S2 are arranged in the first direction dr1. In relation to the fact that the width (length L3) of the protruding portion 45 is greater than the length LA of the heat transfer tube 60 in the width direction as described above, the length of the heat-transfer-tube insertion space S2 in the third direction dr3 is greater than the length of the heat transfer tube 60 in the third direction dr3. One end of a corresponding one of the heat transfer tubes 60 is inserted into the heat-transfer-tube insertion space S2. That is, the heat-transfer-tube insertion space S2 communicates with the flow paths 65 of the heat transfer tube 60. The heat-transfer-tube insertion space S2 communicates with a corresponding one of the second holes H2 via the communication hole Ha formed in the base portion 41. That is, the heat-transfer-tube insertion space S2 communicates with a corresponding one of the communication flow paths CP1.

In the header 10, the plurality of communication flow paths CP1, which allow the body inner space S1 and the heat-transfer-tube insertion space S2 to communicate with each other, are formed. In the header 10, the plurality of communication flow paths CP1 are arranged in the first direction dr1. One end of each communication flow path CP1 communicates with the body inner space S1, and the other end of the communication flow path CP1 communicates with any one of the communication holes Ha. The communication flow path CP1 allows the body inner space S1 and the heat-transfer-tube insertion space S2 to communicate with each other via a corresponding one of the communication holes Ha. That is, the body inner space S1 and each heat-transfer-tube insertion space S2 communicate with each other via a corresponding one of the communication flow paths CP1 and a corresponding one of the communication holes Ha.

(2-3) Flow of Refrigerant in Heat Exchanger 100

When an apparatus including the heat exchanger 100 operates, it is assumed that a refrigerant flows, for example, in the following manner.

The refrigerant flows into the heat exchanger 100 via an inlet pipe (not shown). To be specific, the refrigerant flows into the body inner space S1 of the inlet header via the inlet pipe. The refrigerant flowed into the body inner space S1 diverges and flows into any one of the communication flow paths CP1. The refrigerant flowed through the communication flow path CP1 flows into the heat-transfer-tube insertion space S2 communicating with the refrigerant communication flow path CP1. The refrigerant flowed into the heat-transfer-tube insertion space S2 flows into each flow path 65 of the heat transfer tube 60 inserted into the heat-transfer-tube insertion space S2. The refrigerant flowed into the flow paths 65 of the heat transfer tube 60 flows through the heat exchange unit 1, and exchanges heat with air passing through the heat exchange unit 1.

The refrigerant flowed through the heat exchange unit 1 flows into the heat-transfer-tube insertion space S2 of the outlet header. The refrigerant flowed into the heat-transfer-tube insertion space S2 flows into the communication flow path CP1 communicating with the heat-transfer-tube insertion space S2. The refrigerant flowed through the communication flow path CP1 flows into the body inner space S1. The refrigerant flowed into the body inner space S1 via the heat-transfer-tube insertion space S2 and the communication flow path CP1 merges with a refrigerant flowed into the body inner space S1 through other heat-transfer-tube insertion spaces S2 and other communication flow paths CP1, and flows out to an outlet pipe (not shown).

(2-4) Production of Heat Exchanger 100

The header body 20 is formed by extrusion. In relation to this, the body portion 21 and the communication portion 25 are integrally formed.

The header second member 40 is formed by extrusion. In relation to this, the base portion 41 and each protruding portion 45 are integrally formed.

The header body 20 and the header first member 30 are temporarily fixed to each other, with the header second member 40 and the header third member 50 interposed therebetween. Due to the temporal fixture, in a completed state, the body portion 21, the communication portion 25, the header third member 50, the base portion 41, each protruding portion 45, and the first surrounding portion 31 are arranged in order in the second direction dr2; and the outside in the third direction dr3 of the communication portion 25, the header third member 50, the base portion 41, and each protruding portion 45 is covered by the second surrounding portion 32 and the third surrounding portion 33. In relation to this, the header third member 50, which is made of a cladding material, is positioned between the header body 20 and the header second member 40. That is, the brazing material is disposed between the header body 20 and the header second member 40. The header first member 30, which is made of a cladding material, is disposed outside in the third direction dr3 of the communication portion 25, the header third member 50, the base portion 41, and each protruding portion 45. That is, the brazing material is disposed outside in the third direction dr3 of the communication portion 25, the header third member 50, the base portion 41, and each protruding portion 45.

The plurality of heat transfer tubes 60 are inserted into the header 10 in the assembled state via the heat-transfer-tube insertion holes 310. Both headers 10 and the heat exchange unit 1, which are in a coupled state, are conveyed into a furnace and brazed in the furnace, and thereby the parts are joined to each other.

(2-5) Function of Heat Exchanger 100

<Reduction of Pressure Loss>

If the heat transfer tube is directly inserted into the header body as in the existing technology (such as PTL 1) without using other members, a tip end of the heat transfer tube protrudes into the body inner space. In relation to this, pressure loss in the body inner space increases due to the presence of the tip end of the heat transfer tube. In particular, the pressure loss increases significantly when a high-pressure refrigerant such as $CO_2$ refrigerant flows in the body inner space. In order to avoid this, in the heat exchanger 100, the heat transfer tube 60 is not configured to be directly inserted into the body inner space S1 of the header body 20. To be specific, in the heat exchanger 100, the heat-transfer-tube insertion space S2, into which the heat transfer tube 60 is inserted, is formed by the header first member 30 and the like. That is, in the heat exchanger 100, the body inner space S1, in which the refrigerant flows in the first direction dr1, and the heat-transfer-tube insertion space S2, into which the heat transfer tube 60 is inserted, are separated from each other. Therefore, increase of pressure loss described above is prevented.

<Improvement of Mass Productivity>

The length L2 of the communication portion 25 of the header body 20 in the thickness direction is 3 mm That is, the thickness of the communication portion 25 is less than or equal to 4 mm Therefore, it is easy to perform a step of forming the first hole H1. That is, because the thickness of the communication portion 25 is less than or equal to 4 mm, increase of time, manpower, and/or cost related to the step of forming the first holes H1 is prevented, whereas the time, manpower, and/or cost may increase if the thickness of the communication portion 25 is greater than 4 mm. In particular, because the thickness of the communication portion 25 is less than or equal to 3 mm, it is easy to form the first hole H1 by using a press-working method that excels in mass productivity. Regarding the step of forming the first hole H1, time, manpower, and/or cost is reduced. In relation to this, mass productivity is improved.

The length L8 of the header third member 50 in the thickness direction is 2.5 mm That is, the thickness of the header third member 50 is less than or equal to 4 mm Therefore, it is easy to perform a step of forming the second hole H2. That is, because the thickness of the header third member 50 is less than or equal to 4 mm, increase of time, manpower, and/or cost related to the step of forming the second hole H2 is prevented, whereas the time, manpower, and/or cost may increase if the thickness of the header third member 50 is greater than 4 mm. In particular, it is easy to form the second hole H2 by using a press-working method that excels in mass productivity. Regarding the step of forming the second hole H2, time, manpower, and/or cost is prevented.

<Improvement of Ease of Assembly>

In the heat exchanger 100, because the protruding portion 45, which extends from the base portion 41 toward the first surrounding portion 31 of the header first member 30 in the second direction dr2, is provided, the first surrounding portion 31 and the base portion 41 are prevented from becoming close to each other, and a space corresponding to the length L5 is formed between the first surrounding portion 31 and the base portion 41. In relation to this, when the heat transfer tube 60 is inserted into the header first member 30, an appropriate insertion length is provided. As a result, extraction of the heat transfer tube 60 inserted into the header first member 30 is prevented. In particular, when the heat exchanger 100 is brazed in a furnace, extraction of the end portion of the heat transfer tube 60 from the header first member 30 due to thermal expansion or thermal contraction is prevented.

<Improvement of Reliability>

In the heat exchanger 100, in relation to the fact that an appropriate insertion length of the heat transfer tube 60 is provided, a tip end part of the heat transfer tube 60 inserted into the heat-transfer-tube insertion space S2 is prevented from becoming close to a member including a brazing material (here, the header first member 30 or the header third member 50). Therefore, in the brazing step, the brazing material is not likely to reach the tip end part of the heat transfer tube 60. As a result, the flow paths 65 of the heat transfer tube 60 are prevented from becoming blocked by the brazing material. Thus, the reliability of the heat exchanger 100 is improved.

A plurality of spaces are formed in the header 10 by the plurality of protruding portions 45 of the header second member 40. In relation to this, a refrigerant can more smoothly flow through the heat exchanger 100, and heat exchange in the heat exchange unit 1 can be more appropriately performed. Thus, the reliability of the heat exchanger 100 is improved.

(3) Features (3-1)

In the embodiments described above, the header 10 includes the header body 20 having a tubular shape, the header first member 30 through which one end of each of the plurality of heat transfer tubes 60 extends, and the header second member 40 positioned between the header body 20 and the header first member 30 in the second direction dr2. The header second member 40 includes the base portion 41 extending in the first direction dr1 and the plurality of protruding portions 45 extending from the base portion 41 toward the header first member 30 in the second direction dr2.

Therefore, the insertion length of the heat transfer tube 60 inserted into the header 10 can be more easily provided. Thus, during assembly of the heat exchanger 100, extraction of the heat transfer tube 60, which is inserted into the header 10, from the header 10 can be prevented. In particular, when members are fixed to each other by brazing, extraction of the heat transfer tube 60 from the header 10 after finishing the brazing step is prevented. Thus, the heat exchanger 100 excels in ease of assembly.

(3-2)

In the embodiments described above, the protruding portion 45 is joined to the header first member 30. Therefore, the protruding portion 45 is firmly fixed to the header first member 30, and the insertion length of the heat transfer tube 60 inserted into the header 10 can be more reliably and appropriately provided.

(3-3)

In the embodiments described above, the length L5 of the protruding portion 45 in the second direction dr2 is greater than or equal to 2 mm That is, the length of the protruding portion 45 in the second direction dr2 is set to a length that is necessary to provide an appropriate insertion length of the heat transfer tube 60 into the header 10. In particular, when members are fixed to each other by brazing, the length of the protruding portion 45 in the second direction dr2 is set so as to provide an insertion length with which extraction of the heat transfer tube 60 from the header 10 due to thermal expansion or thermal contraction is prevented.

(3-4)

In the embodiments described above, the plurality of protruding portions 45 are arranged in the first direction dr1 at intervals greater than or equal to 1 mm Therefore, when members are fixed to each other by brazing, local accumulation of a brazing material in the header 10 is prevented.

(3-5)

In the embodiments described above, the length (L3) of the heat-transfer-tube insertion space S2, which is surrounded by the base portion 41 and the protruding portions 45 that are adjacent to each other, in the third direction dr3 is greater than the length (LA) of the heat transfer tube 60 in the third direction dr3. Therefore, a tip end of the heat transfer tube 60 is prevented from being in contact with the member which is positioned outside of the heat-transfer-tube insertion space S2 in the third direction dr3 and covers the heat-transfer-tube insertion space S2. In relation to this, the posture of the heat transfer tube 60 inserted into the heat-transfer-tube insertion space S2 is prevented from becoming unstable. In the brazing step, blocking of the flow paths 65 of the heat transfer tube 60 by a brazing material, which may occur if the brazing material flows from the second surrounding portion 32 or the third surrounding portion 33 to a tip end of the heat transfer tube 60, is prevented.

(3-6)

In the embodiments described above, the header first member 30 covers the heat-transfer-tube insertion space S2. That is, the header first member 30 has a function of supporting the heat transfer tube 60 and a function of forming the heat-transfer-tube insertion space S2. Thus, increase in the number of constituent members of the header 10 is reduced. Therefore, cost is reduced.

(3-7)

In the embodiments described above, in the base portion 41, the communication hole Ha, which allows the heat-transfer-tube insertion space S2 and the body inner space S1 to communicate with each other, is formed. Therefore, the heat-transfer-tube insertion space S2, which is surrounded by the base portion 41 and the protruding portions 45 that are adjacent to each other, and the body inner space S1 communicate with each other, and a refrigerant flow path is formed between the heat-transfer-tube insertion space S2 and the body inner space S1.

(3-8)

In the embodiments described above, at a surface of the base portion 41 on the heat exchange unit 1 side, the edge portion 411 of the communication hole Ha is chamfered. That is, a part of the edge portion 411, which forms the communication hole Ha of the base portion 41, the part being positioned on the heat transfer tube 60 side, is chamfered. Therefore, during assembly of the heat exchanger 100, it is possible to perform temporary fixing by pressing a tip end of the heat transfer tube 60 against the edge portion 411. Thus, it is easy to make the insertion lengths of the heat transfer tubes 60 uniform, and it is easy to assemble the heat exchanger 100.

(3-9)

In the embodiments described above, the area of the communication hole Ha is greater than the cross-sectional area of all refrigerant flow paths formed in the heat transfer tube 60. Therefore, a large refrigerant flow path is formed between the body inner space S1 and the heat transfer tube 60 inserted into the heat-transfer-tube insertion space S2. As a result, pressure loss of the refrigerant that passes through the communication hole Ha is reduced.

(3-10)

In the embodiments described above, the heat transfer tube 60 is a flat tube in which a plurality of refrigerant flow paths 65 are formed. Therefore, regarding a case where the heat transfer tube 60 is a flat tube, which is particularly likely to be extracted from the header 10 during assembly, extraction of the heat transfer tube 60 from the header 10 during assembly is prevented. In particular, extraction of the flat tube is prevented, whereas the flat tube is particularly likely to be extracted from the header 10 due to thermal expansion or thermal contraction when brazing is performed.

(3-11)

In the embodiments described above, the length L4 of the base portion 41 in the second direction dr2 (thickness direction) is less than the length L6 of the protruding portion 45 in the first direction dr1 (thickness direction). Therefore, it is easy to process the base portion 41. In particular, regarding the base portion 41, it is easy to form the communication hole Ha.

(3-12)

In the embodiments described above, the length of the protruding portion 45 in the first direction dr1 is greater than or equal to twice the length of the base portion 41 in the second direction. Therefore, it is particularly easy to process the base portion 41.

(3-13)

In the embodiments described above, the length of the base portion 41 in the second direction dr2 is less than equal to 4 mm Therefore, regarding the base portion 41, it is possible to form the communication hole Ha by using a press-working method that excels in mass productivity.

(3-14)

In the embodiments described above, the header second member 40 is formed by extrusion. Therefore, it is easy to produce the header second member 40 including the protruding portion 45. Thus, mass productivity is high.

(3-15)

In the embodiments described above, the first direction dr1 is the vertical direction. Therefore, ease of assembly of the heat exchanger 100, which includes the header 10 extending in the vertical direction, is improved.

(3-16)

In the embodiments described above, the brazing material, which joins the header body 20 and the base portion 41, is disposed between the header body 20 and the base portion 41. In relation to this, the header body 20 and the header second member 40 are joined by brazing. Moreover, because the brazing material is disposed between the header body 20 and the base portion 41, during a brazing process, flowing of the brazing material to the heat transfer tube is prevented, and blocking of the flow paths 65 of the heat transfer tube 60 by the brazing material is prevented.

(4) Modifications

The embodiments described above may be modified as in the modifications described below. Each modification may be used in combination with another modification as long as contradiction does not arise.

(4-1) Modification 1

Figure 14:
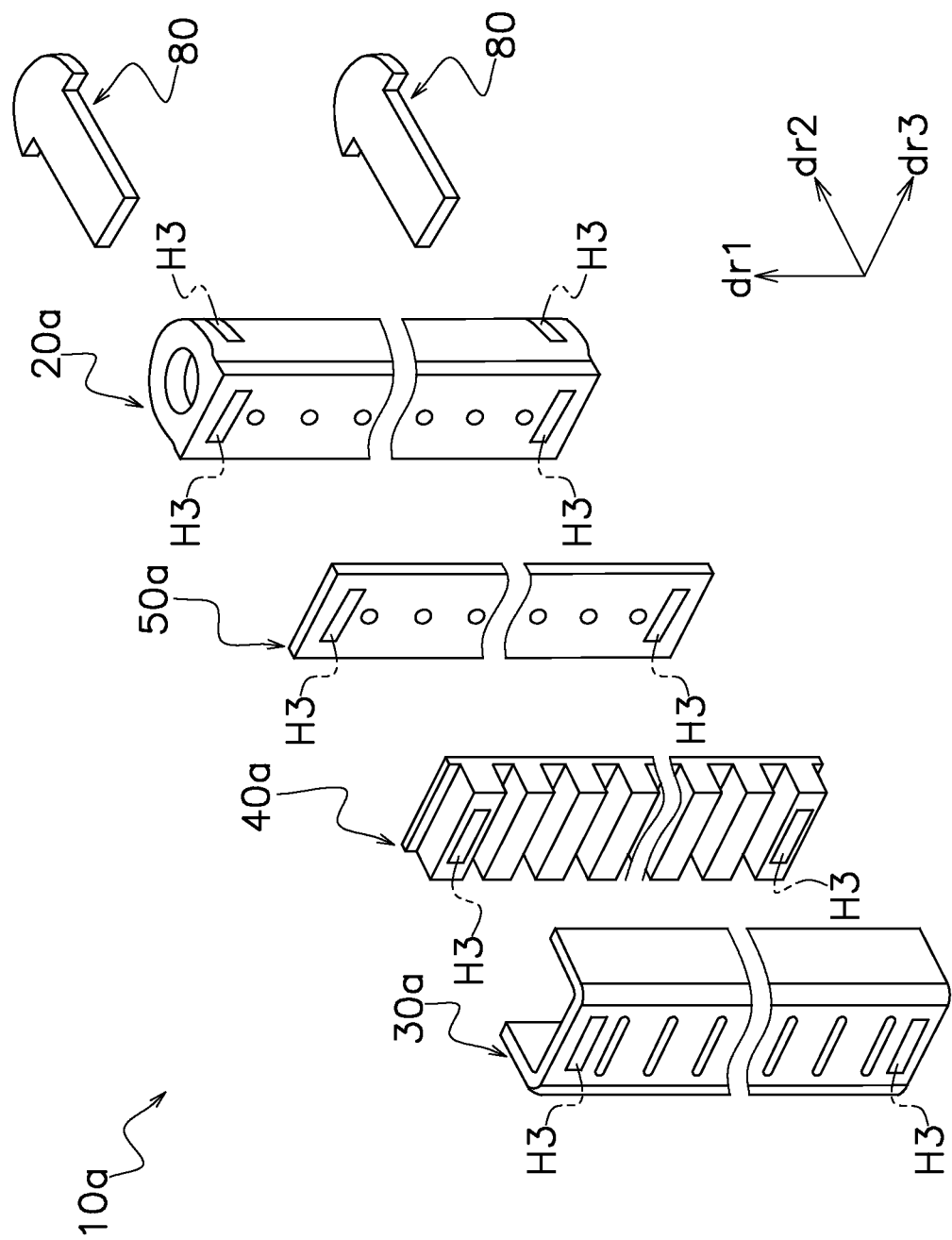
FIG. 14 is an exploded schematic view of a header according to modification 1 of one or more embodiments.
Figure 15:
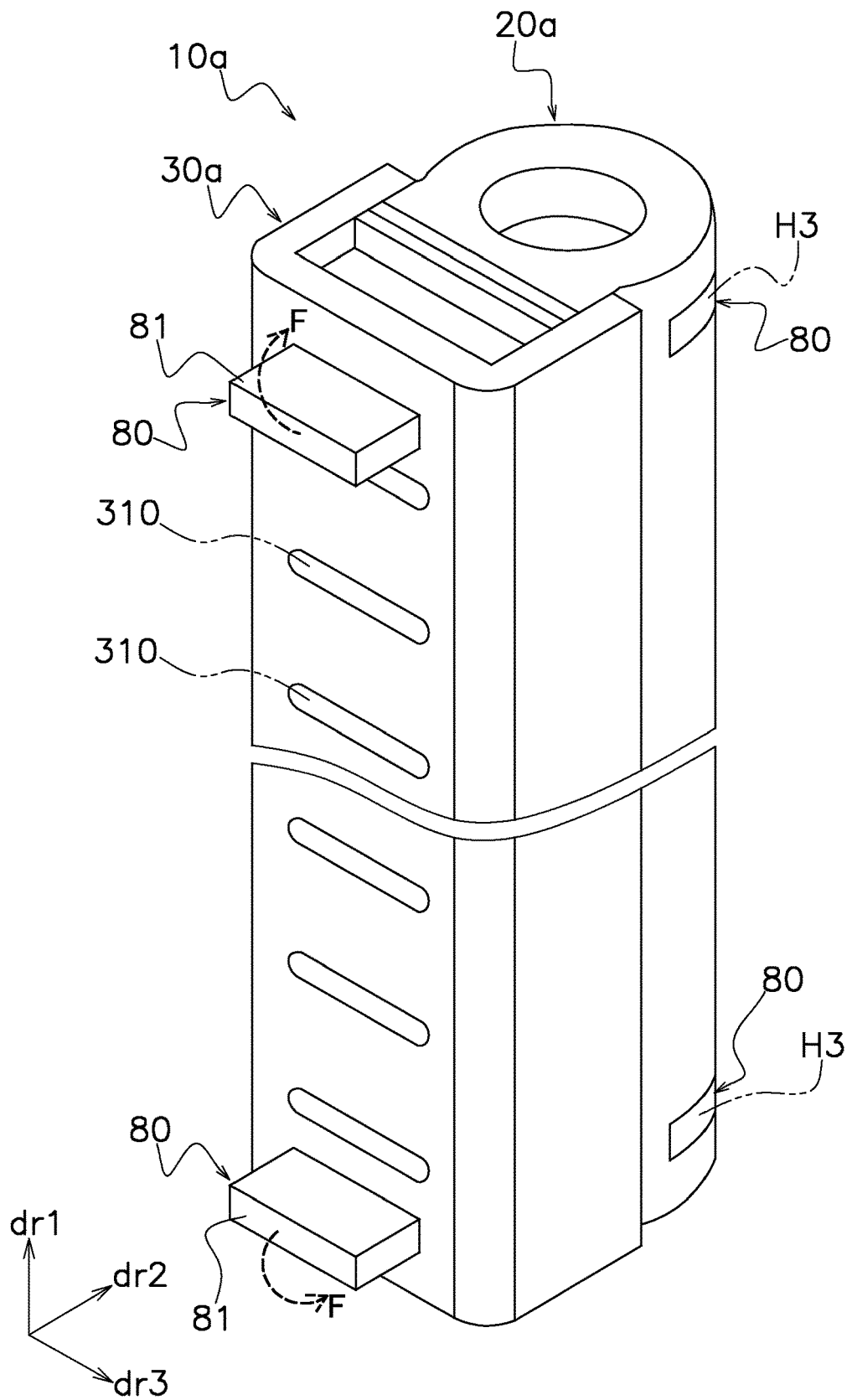
FIG. 15 is a schematic view of the header according to modification 1 of one or more embodiments.

The header 10 according to the embodiments described above may be configured like a header 10a illustrated in FIGS. 14 and 15. Hereafter, the header 10a will be described. Parts whose descriptions are omitted are similar to those of the header 10.

The header 10a includes a header body 20a, a header first member 30a, a header second member 40a, and a header third member 50a, instead of the header body 20, the header first member 30, the header second member 40, and the header third member 50. The header 10a further includes a plurality of penetration members 80.

The penetration member 80 extends through the header body 20a, the header first member 30a, the header second member 40a, and the header third member 50a in the second direction dr2. The penetration member 80 has a plate-like shape. The penetration member 80 extends in the second direction dr2. The penetration member 80 has a dimension in the second direction dr2 that is sufficient for the penetration member 80 to extend through the header first member 30a, the header second member 40a, and the header third member 50a. To be more specific, the penetration member 80 has a length such that the penetration member 80 extends through these members in the second direction dr2 and a tip end part 81 thereof protrudes further.

In the body portion 21, the communication portion 25, the first surrounding portion 31, the header second member 40, and the header third member 50 of the header 10a, through holes H3, through which the penetration members 80 extend, are formed in accordance with the number of penetration members 8. The shape and size of the through holes H3 are set in accordance with the shape and size of the penetration members 80.

As illustrated in FIG. 15, in the process of producing the header 10a, in a temporarily assembled state before members are joined to each other, the members are in a state in which the penetration members 80 extend therethrough via the through holes H3. In such a state, the tip end part 81 of the penetration member 80 which protrudes from the through hole H3 of the first surrounding portion 31 engages with the first surrounding portion 31, and thus the members are firmly and temporarily fixed to each other. For example, the penetration member 80 engages with the first surrounding portion 31 as the tip end part 81 is bent. In such a case, the tip end part 81 of the penetration member 80 may be bent, for example, in a manner illustrated in FIG. 15 (see the broken line F in FIG. 15).

In the header 10a, by using the penetration member 80 and the through hole H3, members are firmly fixed in a temporarily assembled state. Thus, it is easy to temporarily fix the members to each other before assembling the members. The temporarily assembled members are prevented from being bent, and failure in brazing is reduced. Thus, ease of assembly is further improved.

In the header 10a, the number of penetration members 80 may be changed as appropriate in accordance with design specifications. For example, the penetration member 80 may be disposed for each refrigerant path formed in the header 10a. In the header 10a, the shape and size of the penetration member 80 may be changed as appropriate in accordance with design specifications. The penetration member 80 may function as a partitioning member that divides the space in the header. For example, the header 10a may be configured so that one penetration member 80 divides the body inner space S1 or the heat-transfer-tube insertion space S2 into two spaces in the first direction dr1.

(4-2) Modification 2

Figure 16:
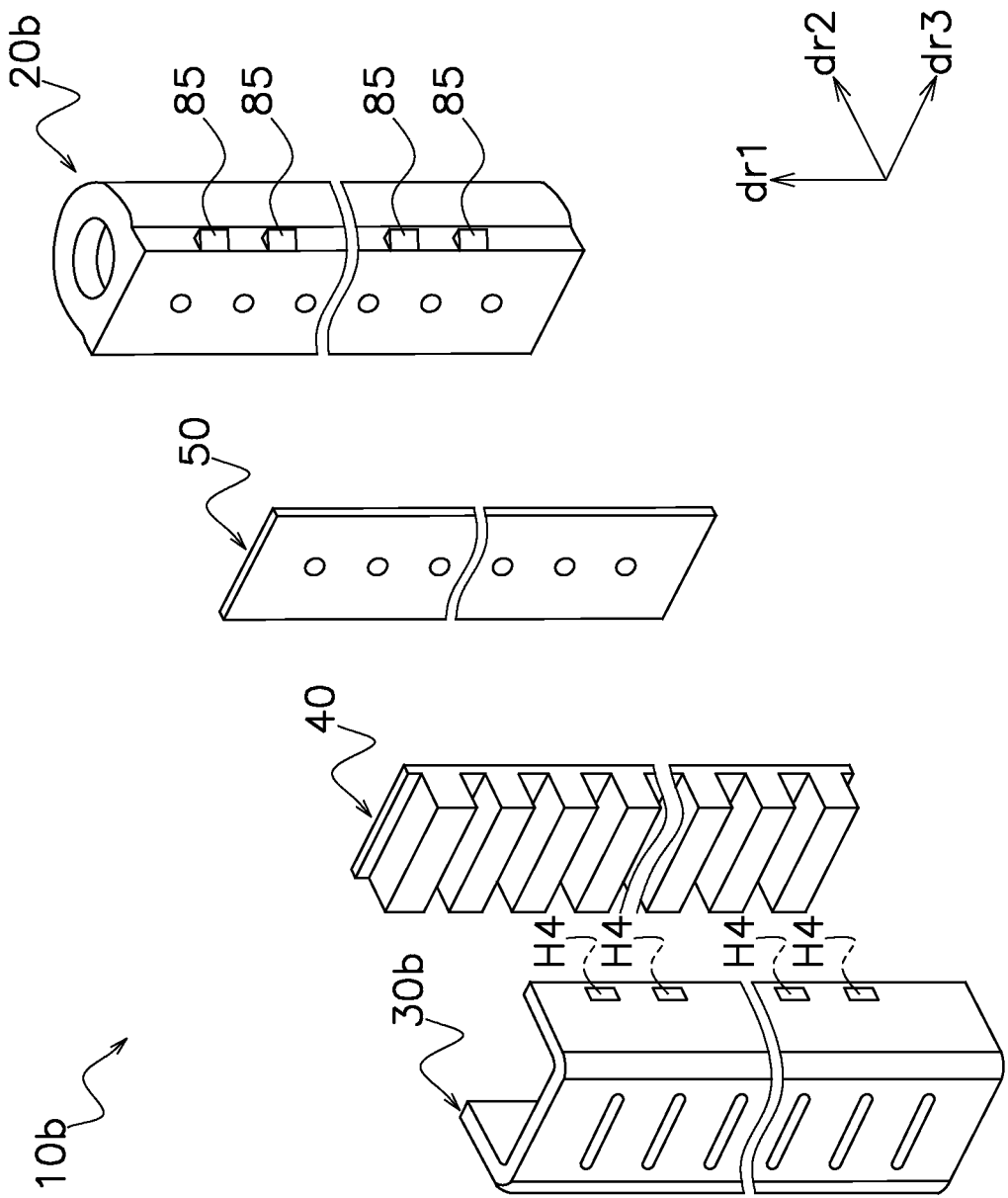
FIG. 16 is an exploded schematic view of a header according to modification 2 of one or more embodiments.
Figure 17:
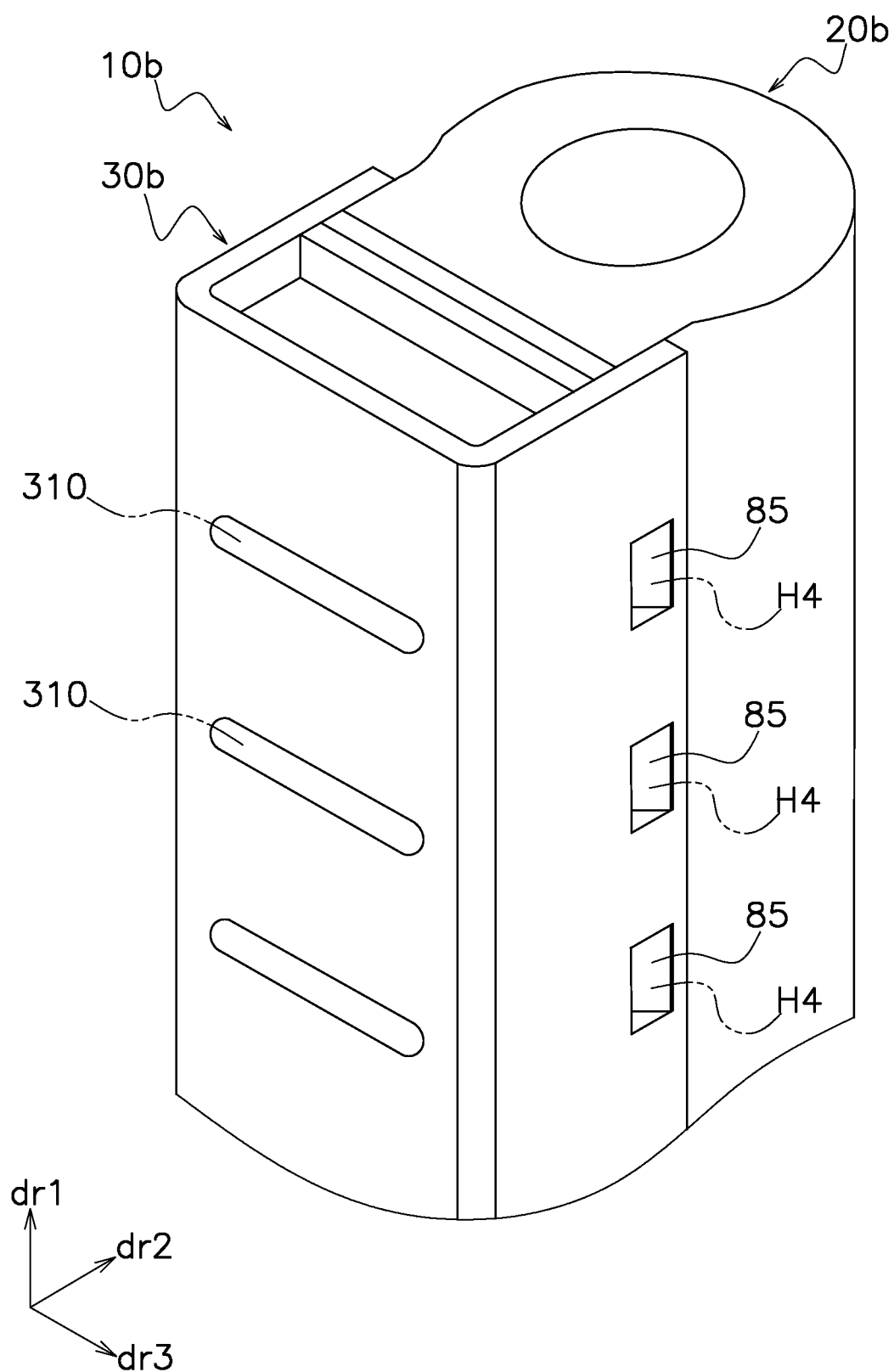
FIG. 17 is a schematic view of the header according to modification 2 of one or more embodiments.

The header 10 according to the embodiments described above may be configured like a header 10b illustrated in FIGS. 16 and 17. Hereafter, the header 10b will be described. Parts whose descriptions are omitted are similar to those of the header 10.

Figure 18:
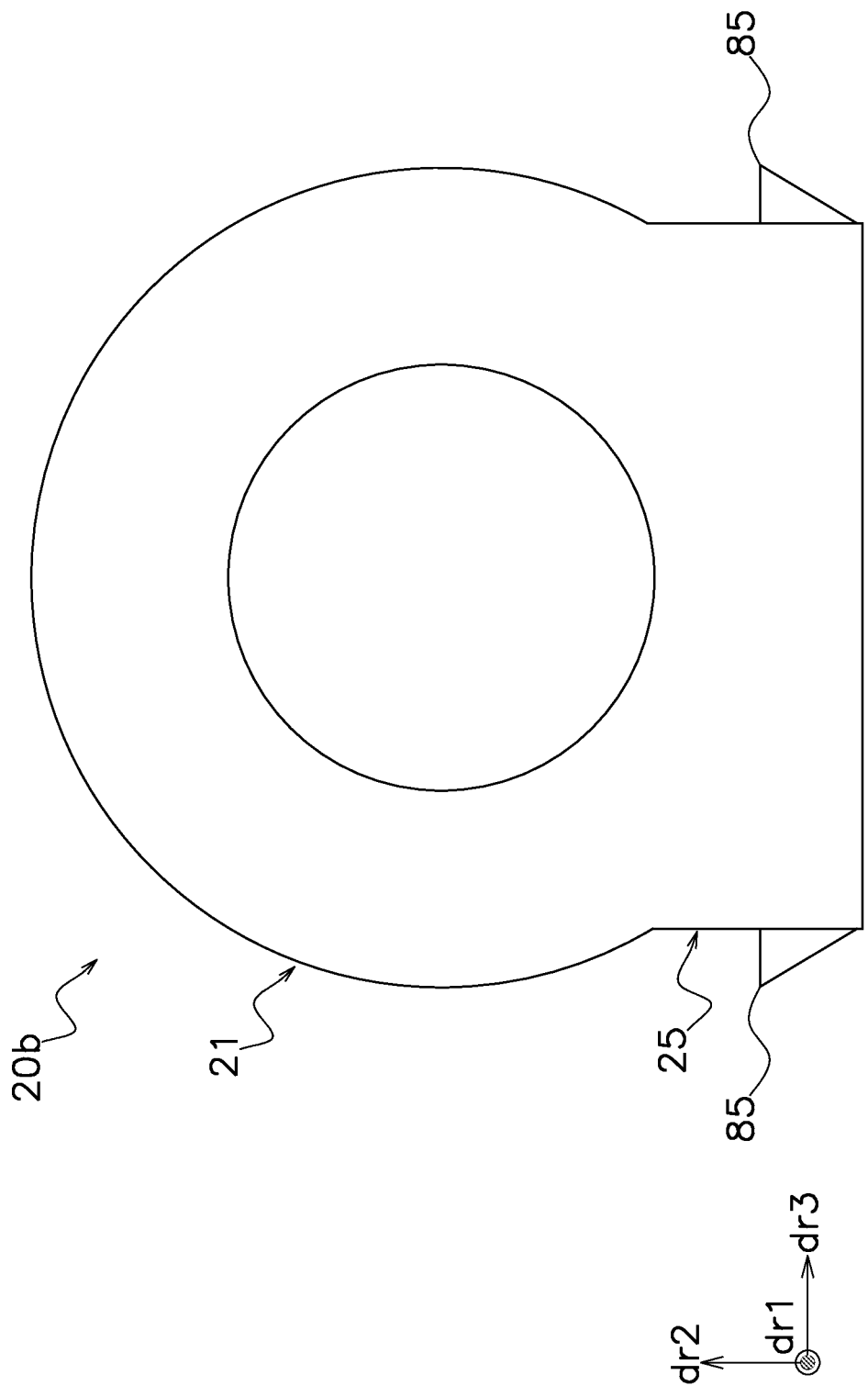
FIG. 18 is a schematic view of a header body according to modification 2 of one or more embodiments as seen from the first direction.

The header 10b includes a header body 20b and a header first member 30b, instead of the header body 20 and the header first member 30. The header 10b includes ribs 85 (engagement portions). The ribs 85 are disposed in the communication portion 25 of the header body 20b. To be more specific, the ribs 85 are disposed in both end parts of the communication portion 25 of the header body 20b in the third direction dr3. In the communication portion 25 of the header body 20b, a plurality of ribs 85 are arranged in the first direction dr1 at intervals (see FIG. 16). As illustrated in FIG. 18, the rib 85 has a substantially right-triangular shape as seen from the first direction dr1. To be more specific, the rib 85 has a right-triangular shape such that, as seen from the first direction dr1, both ends of the communication portion 25 in the third direction dr3 correspond to the base and the hypotenuse extends from the communication portion 25 side toward the body portion 21 side.

Engagement holes H4 are formed in the header first member 30b. To be specific, a plurality of engagement holes H4 are formed in the second surrounding portion 32 and the third surrounding portion 33 of the header first member 30b. The rib 85 engages with the engagement hole H4. Here, the meaning of the phrase "engages with the engagement hole H4" includes the meaning that the rib 85 is fitted into the engagement hole H4. The meaning of the phrase "engages with the engagement hole H4" includes the meaning that the rib 85 engages with an edge that forms the engagement hole H4. To be more specific, as seen from the first direction dr1, a side of the right-triangular rib 85 connecting the base and the hypotenuse engages with the edge of the engagement hole H4. That is, the rib 85 includes an engagement part that engages with the engagement hole H4.

Each engagement hole H4 is disposed at a position corresponding to the position of the rib 85 in a state in which the header 10b is temporarily assembled. The engagement hole H4 has shape and size such that, in accordance with the shape and size of the rib 85, the rib 85 engages with the edge of the engagement hole H4 in a state in which the header 10b is temporarily assembled. For example, the engagement hole H4 is substantially rectangular as seen from the third direction dr3. The number of engagement holes H4 corresponds to the number of ribs 85.

As illustrated in FIG. 17, in the process of producing the header 10b, in a temporarily assembled state before the members are joined to each other, each of the ribs 85 and a corresponding one of the engagement holes H4 engage with each other, and thus the members are firmly and temporarily fixed to each other. The meaning of the term "fix" includes the meaning of so-called "interference fit". That is, in the header 10b, due to the ribs 85 and the engagement holes H4, the members are firmly fixed in a temporarily assembled state. Thus, when assembling the members, it is easy to temporarily fix the members to each other.

In the header 10b, the position of the rib 85 may be changed as appropriate in accordance with design specifications. For example, the rib 85 may be disposed in a member other than the communication portion 25. For example, the rib 85 may be disposed in the body portion 21. Likewise, the position of the engagement hole H4 may be changed as appropriate in accordance with design specifications. For example, if some or all of the plurality of ribs 85 are formed in the second surrounding portion 32 and/or the third surrounding portion of the header first member 30b, the engagement holes H4 corresponding to the ribs 85 may be formed in the communication portion 25 and/or the body portion 21 of the header body 20.

In the header 10b, the number of ribs 85, the shape of each rib 85, the dimensions of each part, and/or the size of each rib 85 may be changed as appropriate in accordance with design specifications. For example, the rib 85 may have a shape other than a right-triangular shape as seen from the first direction dr1. For example, the rib 85 may have a trapezoidal shape as seen from the first direction dr1.

(4-3) Modification 3

Figure 19:
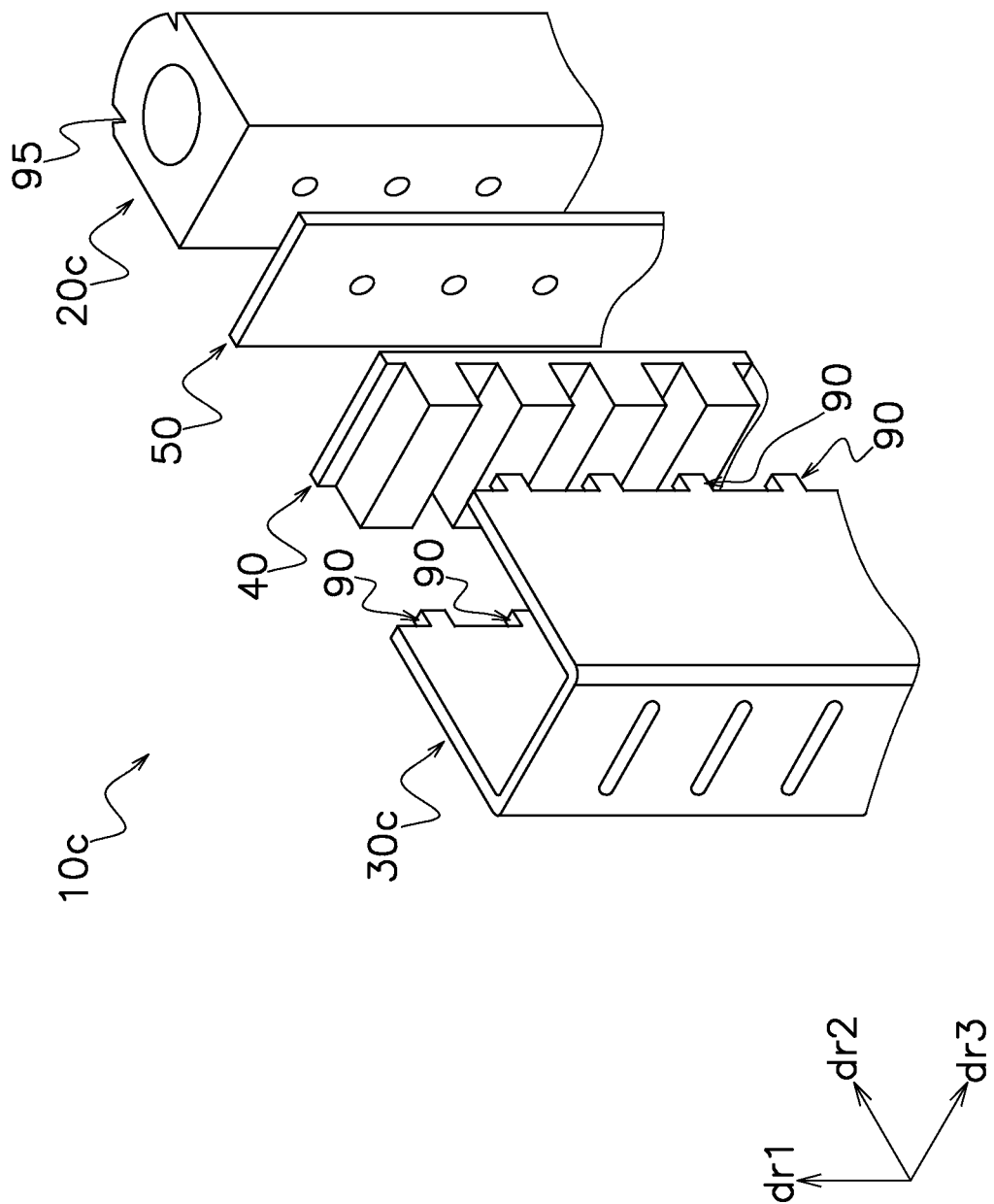
FIG. 19 is an exploded schematic view of a header according to modification 3 of one or more embodiments.
Figure 20:
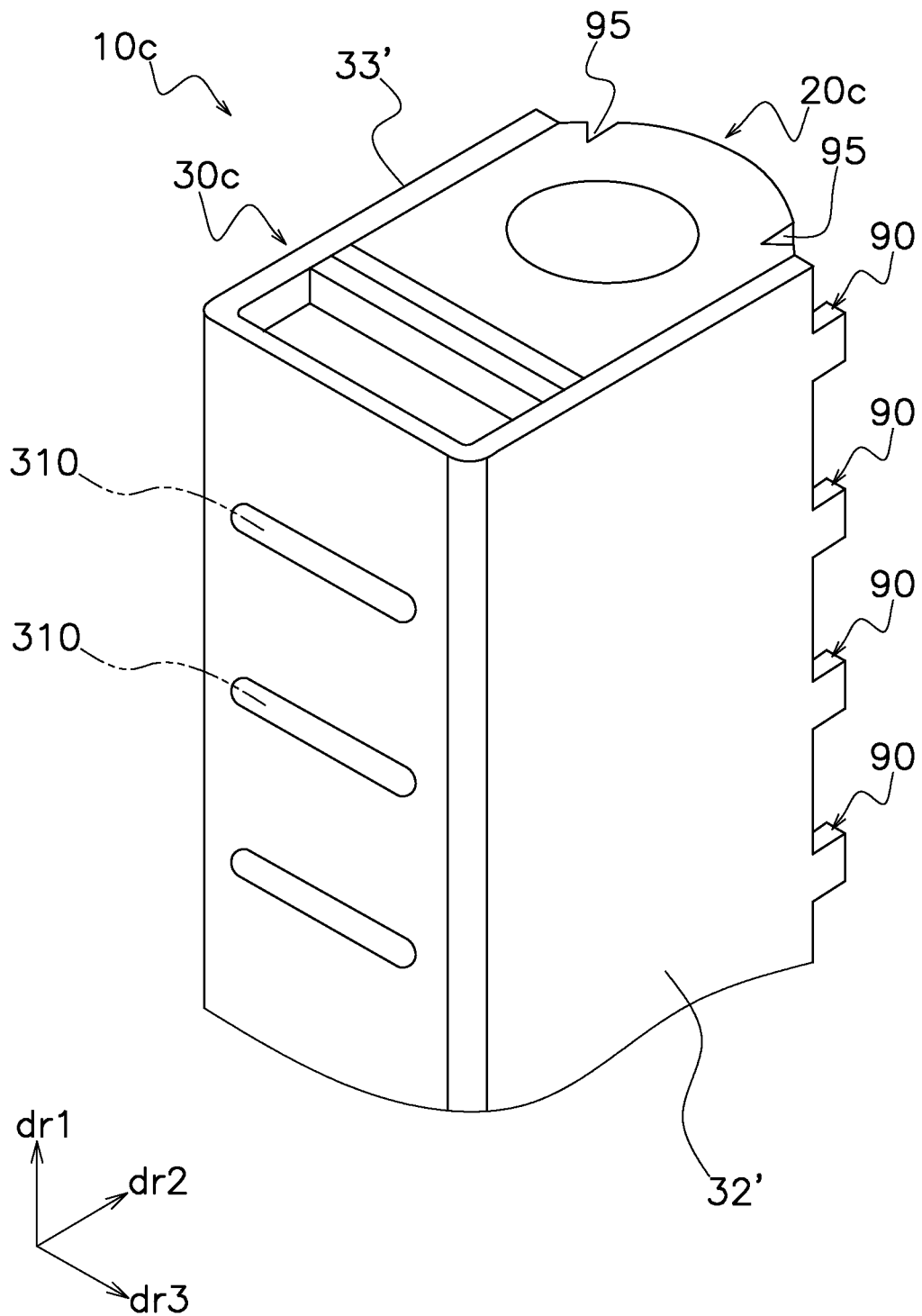
FIG. 20 is a schematic view of the header according to modification 3 of one or more embodiments.
Figure 21:
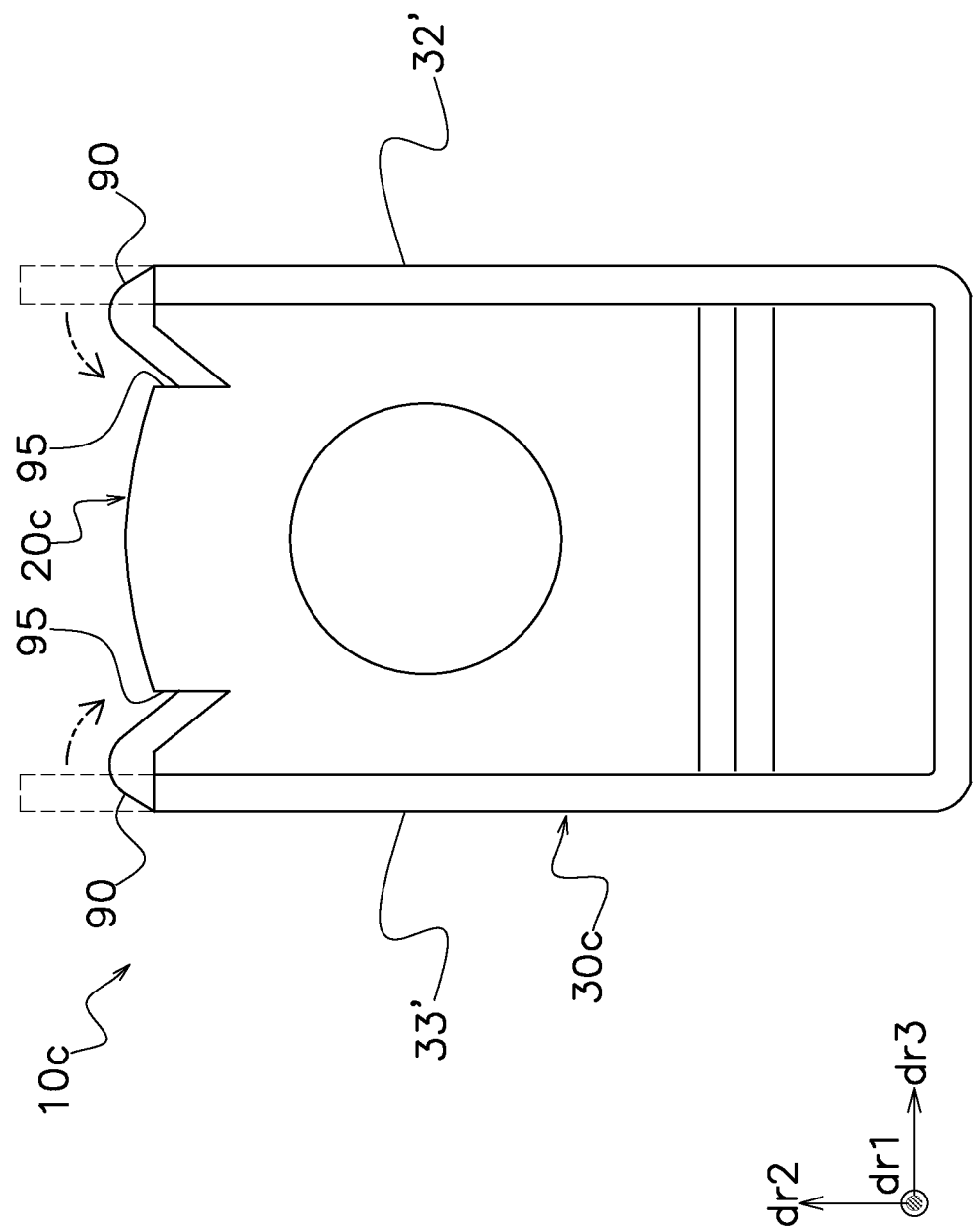
FIG. 21 is a schematic view of the header according to modification 3 of one or more embodiments as seen from the first direction.

The header 10 according to the embodiments described above may be configured like a header 10c illustrated in FIGS. 19 to 21. Hereafter, the header 10c will be described. Parts whose descriptions are omitted are similar to those of the header 10.

The header 10c includes a header body 20c and a header first member 30c, instead of the header body 20 and the header first member 30.

The shape of the header body 20c differs from that of the header body 20 and is substantially rectangular as seen from the first direction dr1. A surface of the header body 20c on the outermost side in the second direction dr2 has a substantially arc-like shape as seen from the first direction dr1. Therefore, the thickness of the header body 20c is reduced. A plurality of concave portions 95 (described below), which extend in the first direction dr1, are provided in the surface of the header body 20c on the outermost side in the second direction dr2 (see FIG. 21).

The length of a second surrounding portion (32') and a third surrounding portion (33') of the header first member 30c in the second direction dr2 is greater than that of the header first member 30. To be more specific, the length of the second surrounding portion 32' and the third surrounding portion 33' in the second direction dr2 is greater than the length of the header body 20c in the second direction dr2. In relation to this, in a state in which the header 10c is assembled, parts of the body portion 21 of the header body 20c facing in the third direction dr3 are covered by the second surrounding portion 32' (second portion) and the third surrounding portion 33' (second portion) of the header first member 30c (see FIGS. 20 and 21).

In the header 10c, the header first member 30c includes ribs 90. To be more specific, the ribs 90 are disposed in the second surrounding portion 32' and the third surrounding portion 33' of the header first member 30c. For example, as illustrated in FIG. 19, in the header body 20c, at end portions of the second surrounding portion 32' and the third surrounding portion 33' on the header body 20 side, a plurality of ribs 90 (convex portions) are disposed at intervals in the first direction dr1. In other words, the second surrounding portion 32' and the third surrounding portion 33' extend toward the header body 20c in the second direction dr2 from both ends of the first surrounding portion 31 in the transversal direction (here, the third direction dr3) and have the ribs 90 at tip ends thereof. The rib 90 is substantially rectangular as seen from the third direction dr3.

In the header 10c, a plurality of (here, two) concave portions 95 are formed in the body portion 21 of the header body 20c. The concave portion 95 is a recessed part that engages with the rib 90. Here, the meaning of the term "engage with" includes the meaning of "fit into". The concave portion 95 is positioned in the header body 20c on a side opposite to the header second member 40 in the second direction dr2. The concave portion 95 is recessed inward in the second direction dr2 as seen from the first direction dr1. The concave portion 95 extends in the body portion 21 in the first direction dr1. The concave portion 95 has shape and size such that, in accordance with the shape and size of the rib 90, the rib 90 engages with the edge of the concave portion 95 in a state in which the header 10c is temporarily assembled.

As illustrated in FIG. 20, in the process of producing the header 10c, in a temporarily assembled state before the members are joined to each other, each of the ribs 90 and a corresponding one of the concave portions 95 engage with each other, and thus the members are crimped to each other. To be more specific, in a state in which members of the header 10c are assembled, each rib 90 is bent toward the concave portion 95 as shown by a two-dot chain line arrow in FIG. 21, and thereby each rib 90 engages with the concave portion 95. In other words, it can be said that in the header 10c, because each rib 90 is engaged with the concave portion 95, the second surrounding portion 32' and the third surrounding portion 33' having the ribs 90 engage with the header body 20c. Therefore, in a temporarily assembled state, each member is firmly and temporarily fixed. Thus, when assembling the members, it is easy to temporarily fix the members to each other.

In the header 10c, the configurations, such as the shape, dimensions of parts, and size of the header body 20c and/or the header first member 30c may be changed as appropriate in accordance with design specifications. For example, the surface of the header body 20c on the outermost side in the second direction dr2 need not have a substantially arc-like shape as seen from the first direction dr1.

The position of the rib 90 may be changed as appropriate in accordance with design specifications. For example, the rib 90 may be disposed in a member other than the second surrounding portion 32' and/or the third surrounding portion 33'. Likewise, the position of the concave portion 95 may be changed as appropriate in accordance with design specifications. In the header 10c, the number of ribs 90, the shape of each rib 90, the dimensions of each part, and/or the size of each rib 90 may be changed as appropriate in accordance with design specifications. For example, the rib 90 may have a shape other than a rectangular shape as seen from the third direction dr3. For example, the rib 90 may have a semicircular shape as seen from the third direction dr3.

(4-4) Modification 4

In the embodiments described above, the header body 20 and the header second member 40 are formed by extrusion. However, one or both of the header body 20 and the header second member 40 need not be formed by extrusion and may be formed by using another method.

(4-5) Modification 5

In the embodiments described above, the base portion 41 of the header second member 40 and each protruding portion 45 are integrally formed. However, the base portion 41 and each protruding portion need not be integrally formed, and may be configured independently. The protruding portion 45 may be disposed as an independent member.

(4-6) Modification 6

The header second member 40, which is disposed in the header 10, may be configured by combining a plurality of members. That is, the header second member 40 may be formed by sequentially arranging a plurality of members, each including at least one protruding portion 45 in the first direction dr1.

(4-7) Modification 7

In the embodiments described above, the header first member 30 and the header third member 50 include a brazing material and function as joining members that join the members to each other. However, instead of the header first member 30 and/or the header third member 50, another member including a brazing material may be disposed in the header 10, and the other member may function as a joining member.

(4-8) Modification 8

The number, configurations, and arrangement of the constituent members of the header 10 are not limited to those described in the above embodiments and may be changed as appropriate in accordance with setting environment and design specifications. For example, the header 10 may include members that are not described in the above embodiments. For example, some of the constituent members of the header 10 described in the above embodiments may be omitted as appropriate. For example, if the header second member 40 includes a brazing material, the header third member 50 may be omitted as appropriate.

(4-9) Modification 9

In the embodiments described above, the protruding portion 45 is joined to the header first member 30. In one or more embodiments, the header 10 may be configured in such a manner, in order to realize the advantageous effects described in (3-2). However, the protruding portion 45 need not be joined to the header first member 30. Also in such a case, the advantageous effects described in (3-1) can be realized.

(4-10) Modification 10

In the embodiments described above, the length L5 of the protruding portion 45 in the second direction dr2 is greater than or equal to 2 mm. However, the length L5 of the protruding portion 45 in the second direction dr2 may be less than 2 mm, provided that the length of the protruding portion 45 in the second direction dr2 allows the insertion length of the heat transfer tube 60 into the header 10 to be appropriately provided. Also in such a case, the advantageous effects described in (3-1) can be realized.

(4-11) Modification 11

In the embodiments described above, the plurality of protruding portions 45 arranged in the first direction dr1 at intervals greater than or equal to 1 mm. In one or more embodiments, the header 10 may be configured in such a manner, in order to prevent a brazing material from being accumulated locally. However, in the header 10, the plurality of protruding portions 45 need not be arranged at intervals greater than or equal to 1 mm in the first direction dr1. For example, the plurality of protruding portions 45 may be arranged in the first direction dr1 at intervals less than 1 mm. Also in such a case, the advantageous effects described in (3-1) can be realized.

(4-12) Modification 12

In the embodiments described above, the length of the heat-transfer-tube insertion space S2, which is surrounded by the base portion 41 and the protruding portions 45 that are adjacent to each other, in the third direction dr3 is greater than the length of the heat transfer tube 60 in the third direction dr3. In one or more embodiments, the header 10 may be configured in such a manner, in order to realize the advantageous effects described in (3-5). However, the header 10 need not be configured in such a manner. For example, the length of the heat-transfer-tube insertion space S2 in the third direction dr3 may be substantially the same as the length of the heat transfer tube 60 in the third direction dr3. Also in such a case, the advantageous effects described in (3-1) can be realized.

(4-13) Modification 13

In the embodiments described above, the header first member 30 covers the heat-transfer-tube insertion space S2. In one or more embodiments, the header 10 may be configured in such a manner, in order to realize the advantageous effects described in (3-6). However, the header 10 need not be configured in such a manner. Also in such a case, the advantageous effects described in (3-1) can be realized.

(4-14) Modification 14

In the embodiments described above, in a surface of the base portion 41 on the heat exchange unit 1 side, the edge portion 411 of the communication hole Ha is chamfered. In one or more embodiments, during assembly of the heat exchanger 100, positioning can be performed by pressing a tip end of the heat transfer tube 60, which is inserted into the heat-transfer-tube insertion space S2, against the edge portion 411. However, the edge portion 411 need not be chamfered in such a manner. Also in such a case, the advantageous effects described in (3-1) are realized.

(4-15) Modification 15

In the embodiments described above, the area of the communication hole Ha is grater than the cross-sectional area of all refrigerant flow paths formed in the heat transfer tube 60. Therefore, in one or more embodiments, the header 10 may be configured in such a manner, in order to realize the advantageous effects described in (3-9). However, the header 10 need not be configured in such a manner. Also in such a case, the advantageous effects described in (3-1) can be realized.

(4-16) Modification 16

In the embodiments described above, the length L4 of the base portion 41 in the second direction dr2 (thickness direction) is less than the length of the protruding portion 45 in the first direction dr1 (thickness direction). In one or more embodiments, the header 10 may be configured in such a manner, in order to realize the advantageous effects described in (3-11). However, the header 10 need not be configured in such a manner. Also in such a case, the advantageous effects described in (3-1) can be realized.

(4-17) Modification 17

In the embodiments described above, the length of the protruding portion 45 in the first direction dr1 is greater than or equal to twice the length of the base portion 41 in the second direction dr2. In one or more embodiments, the header 10 may be configured in such a manner, in order to realize the advantageous effects described in (3-12). However, the header 10 need not be configured in such a manner. Also in such a case, the advantageous effects described in (3-1) can be realized.

(4-18) Modification 18

In the embodiments described above, the length of the base portion 41 in the second direction dr2 is less than or equal to 4 mm. In one or more embodiments, the header 10 may be configured in such a manner, in order to realize the advantageous effects described in (3-13). However, the header 10 need not be configured in such a manner. Also in such a case, the advantageous effects described in (3-1) can be realized.

(4-19) Modification 19

In the embodiments described above, the direction in which the heat transfer tube 60 extends and the direction in which the protruding portion 45 extends are both the second direction dr2. However, the direction in which the heat transfer tube 60 extends and the direction in which the protruding portion 45 extends need not be parallel.

(4-20) Modification 20

In the embodiments described above, the first direction dr1 is the vertical direction, and the second direction dr2 and the third direction dr3 are horizontal directions. However, the directions are not limited to such a definition. For example, the first direction dr1 may be a horizontal direction. The second direction dr2 or the third direction dr3 may be the vertical direction.

(4-21) Modification 21

The dimensions of each part in the embodiments described above may be changed or selected as appropriate in accordance with design specifications, provided that the dimensions allow the insertion length of the heat transfer tube 60 inserted into the header 10 to be appropriately provided. That is, in one or more embodiments, the values of some or all of L1 to L8, La to Lf, LA, LB, and LX may be changed or selected as appropriate. For example, L1 may be greater than 5 mm, or may be less than 5 mm L2 may be greater than 3 mm, or may be less than 3 mm L3 may be greater than 8 mm, or may be less than 8 mm L4 may be greater than 2 mm, or may be less than 2 mm L5 may be greater than 7 mm, or may be less than 7 mm L6 may be greater than 4 mm, or may be less than 4 mm L7 may be greater than 4 mm, or may be greater than or equal to 1 mm and less than 4 mm L8 may be greater than 2.5 mm, or may be less than 2.5 mm.

(4-22) Modification 22

In the embodiments described above, the header body 20 has a cylindrical shape. However, the header body 20 may have another shape. For example, the header body 20 may have a prismatic tubular shape.

(4-23) Modification 23

In the embodiments described above, the heat exchanger 100 is joined by being brazed in a furnace. However, the heat exchanger 100 may be joined by using another method. For example, parts of the heat exchanger 100 may be joined by spot welding.

(4-24) Modification 24

In the embodiments described above, the longitudinal direction of the heat transfer fin 70 is the same as the longitudinal direction of the header 10, the plurality of cutouts 75 are formed in the longitudinal direction, and the heat transfer tubes 60 are inserted into the cutouts 75. However, the heat transfer fin 70 may be configured in another manner. For example, the heat transfer fin 70 may have, instead of the cutouts 75, a plurality of through holes that are arranged in the first direction dr1, and the heat transfer tubes 60 may be inserted into the through holes. In such a case, the shape and size of the through hole may be selected in accordance with the shape and size of the heat transfer tube 60.

For example, a corrugated fin, which has a wave-like shape as seen from the airflow direction and which is disposed between the heat transfer tubes 60 that adjacent to each other, may be used as the heat transfer fin 70. In such a case, the longitudinal direction of the heat transfer fin 70 coincides with the longitudinal direction of the heat transfer tube 60.

(4-25) Modification 25

In the embodiments described above, the heat exchanger 100 includes the first header 11 and the second header 12 as the header 10. However, the heat exchanger 100 may include an additional header as the header 10.

The heat exchanger 100 may have only one of the first header 11 and the second header 12 as the header 10. That is, the idea according to the present disclosure may be applied to only one of the first header 11 and the second header 12.

(4-26) Modification 26

In the embodiments described above, each constituent member of the header 10 is made of aluminum or an aluminum alloy. However, some or all of the constituent members of the header 10 may be made of another material.

(4-27) Modification 27

In the embodiments described above, the heat transfer tube 60 is a flat tube having a flat cross-sectional shape. However, the heat transfer tube 60 is not limited to a flat tube. For example, the heat transfer tube 60 may be a cylindrical tube having a circular cross section or an elliptical cylindrical tube.

(4-28) Modification 28

In the embodiments described above, the plurality of flow paths 65 are formed in each heat transfer tube 60. However, the number of flow paths 65 formed in each heat transfer tube 60 may be changed as appropriate. For example, a single flow path 65 may be formed in each heat transfer tube 60.

(4-29) Modification 29

In the embodiments described above, the heat transfer tube 60 is made of aluminum or an aluminum alloy. However, the heat transfer tube 60 may be made of another material. For example, the heat transfer tube 60 may be a copper tube.

(4-30) Modification 30

In the embodiments described above, the heat exchanger 100 is an air heat exchanger that causes a refrigerant and airflow to exchange heat. However, the heat exchanger 100 is limited to this. The heat exchanger 100 may be configured to cause a refrigerant and another heat medium (for example, water or the like) to exchange heat. In such a case, a pipe through which a heat medium that performs heat exchange with the refrigerant flows is disposed in the heat exchange unit 1. The heat transfer fin 70 is omitted as appropriate.

(4-31) Modification 31

In the embodiments described above, a refrigerant that flows in the heat exchanger 100 is a $CO_2$ refrigerant. However, the refrigerant that flows in the heat exchanger 100 is not limited to a $CO_2$ refrigerant, and may be changed as appropriate. For example, the refrigerant that flows in the heat exchanger 100 may be a high-pressure refrigerant other than a $CO_2$ refrigerant. For example, the refrigerant that flows in the heat exchanger 100 may be an HFC refrigerant such as R32 or R410A.

(4-32) Modification 32

In one or more embodiments, the header 10 is constituted by the header first member 30, the header second member 40, the header third member 50, and the header body 20.

Figure 22:
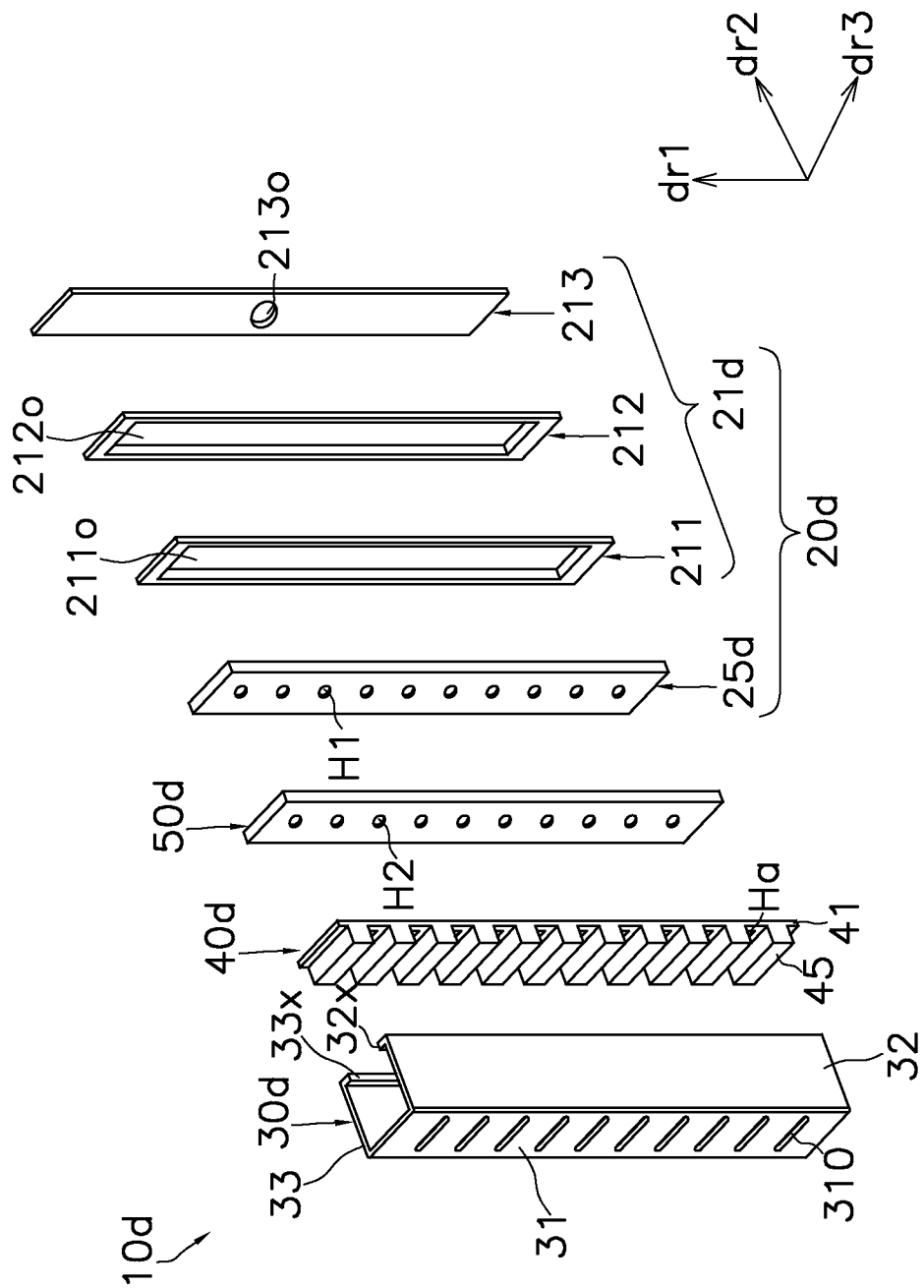
FIG. 22 is an exploded perspective view of a header according to modification 32 of one or more embodiments.
Figure 23:
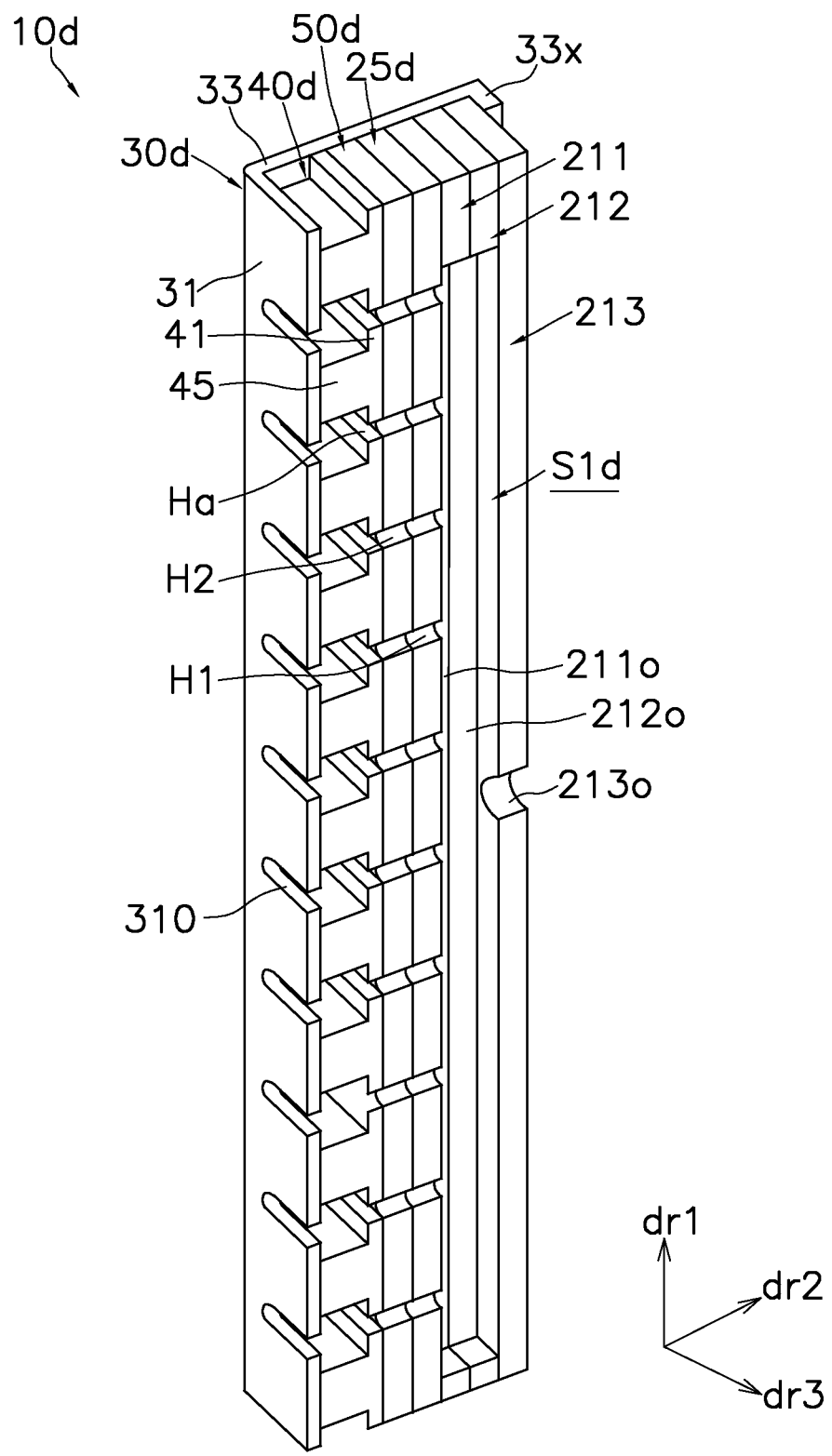
FIG. 23 is a sectional perspective view of the header according to modification 32 of one or more embodiments.

Alternatively, for example, as illustrated in FIGS. 22 and 23, the header may be a header 10d that includes a header first member 30d, a header second member 40d, a header third member 50d, and a header body 20d.

The header first member 30d, the header second member 40d, and the header third member 50d of the header 10d substantially correspond to the header first member 30, the header second member 40, and the header third member 50 of the embodiments described above, respectively. The second surrounding portion 32 of the header first member 30d includes a second claw portion 32x whose end portion on a side opposite to the side to which the heat transfer tube 60 is connected is folded inward. The third surrounding portion 33 of the header first member 30d includes a third claw portion 33x whose end portion on a side opposite to the side to which the heat transfer tube 60 is connected is folded inward. By folding the claw portions inward in the production process, the header second member 40d, the header third member 50d, and the header body 20d can be crimped in the header first member 30d.

The header body 20d includes a communication plate 25d and a stacked plate group 21d.

The communication plate 25d corresponds to a plate-shaped member consisting only the communication portion 25 of the header body 20 of the embodiments described above, and has a plurality of first holes H1 arranged in the longitudinal direction.

The stacked plate group 21d includes a first stacked plate 211, a second stacked plate 212, and a third stacked plate 213. The first stacked plate 211 has a first through port 2110 that extends therethrough in the plate-thickness direction and has a substantially rectangular shape as seen in the plate-thickness direction. As with the first stacked plate 211, the second stacked plate 212 has a second through port 212o that extends therethrough in the plate-thickness direction and has a substantially rectangular shape as seen in the plate-thickness direction. The third stacked plate 213 has a third through port 213o that extends therethrough in the plate-thickness direction and has a substantially circular shape as seen in the plate-thickness direction. The third through port 213o is an insertion hole for a refrigerant pipe connected to the heat exchanger 100.

The communication plate 25d, the first stacked plate 211, the second stacked plate 212, and the third stacked plate 213 of the stacked plate group 21d are stacked in this order in the plate-thickness direction. As seen in the stacking direction, the plurality of first holes H1 formed in the communication plate 25d are positioned inside of the contour of the first through port 2110 of the first stacked plate 211 and the contour of the second through port 212o of the second stacked plate 212. Therefore, the body inner space S1d having a substantially quadrangular prismatic shape is formed in the header body 20d.

As described above, also when the header includes a part in which a plurality of plate-shaped members each having an opening are stacked, advantageous effects similar to those of the embodiments described above can be obtained. Moreover, because the shape of each of the plate-shaped members is simple, for example, it is possible produce the plate-shape member by press-forming the plate-shaped member to form the opening. Therefore, it is possible to facilitate production of the header.

5

Although the disclosure has been described with respect to only a limited number of embodiments, those skilled in the art, having benefit of this disclosure, will appreciate that various other embodiments may be devised without departing from the scope of the above-described embodiments. Accordingly, the scope of the above-described embodiments should be limited only by the attached claims.

INDUSTRIAL APPLICABILITY

The present disclosure is applicable to a heat exchanger.

REFERENCE SIGNS LIST 1 heat exchange unit
10, 10a to 10d header
11 first header
12 second header
20, 20a to 20d header body
21 body portion
25 communication portion
30, 30a to 30d header first member (first member)
31 first surrounding portion (first portion)
32, 32' second surrounding portion (second portion)
33, 33' third surrounding portion (second portion)
40, 40a, 40d header second member (second member)
41 base portion
45 protruding portion
50, 50a, 50d header third member (brazing material)
60 heat transfer tube
65 flow path
70 heat transfer fin
75 cutout
80 penetration member
tip end part of penetration member
85 rib (engagement portion)
90 rib (convex portion)
95 concave portion
100 heat exchanger
310 heat-transfer-tube insertion hole
411 edge portion (edge that forms communication hole)
CP1 communication flow path
H1 first hole
H2 second hole
H3 through hole
H4 engagement hole
Ha communication hole
S1 body inner space
S2 heat-transfer-tube insertion space (first space)
dr1 first direction
dr2 second direction
dr3 third direction

The invention claimed is:

1. A heat exchanger comprising:
a header that extends in a first direction; and
a plurality of heat transfer tubes that extend in a second direction crossing the first direction, each of which has one end connected to the header, and that are arranged in the first direction at intervals,
wherein the header includes
a header body having a tubular shape,
a first member through which the one end of each of the heat transfer tubes extends, and
a second member positioned between the header body and the first member in the second direction,
wherein the second member includes
a base portion that extends in the first direction, and
a plurality of protruding portions that extend from the base portion toward the first member in the second direction,
wherein a first space is surrounded by the base portion and adjacent protruding portions,
wherein a length of the first space in a third direction, that crosses the first direction and the second direction, is greater than a length of each of the heat transfer tubes in the third direction,
wherein an oblong communication hole is formed in the base portion to allow the first space and an inner space of the header body to communicate with each other, where a longitudinal direction of the oblong communication hole extends in the third direction, and
wherein a part of an edge that forms the oblong communication hole on the heat transfer tube side is chamfered.

2. The heat exchanger according to claim 1,
wherein the protruding portions are joined to the first member.

3. The heat exchanger according to claim 1,
wherein a length of each of the protruding portions in the second direction is greater than or equal to 2 mm.

4. The heat exchanger according to claim 1,
wherein the plurality of protruding portions are arranged in the first direction at intervals greater than or equal to 1 mm.

5. The heat exchanger according to claim 1,
wherein the first member covers the first space.

6. The heat exchanger according to claim 1,
wherein an area of the oblong communication hole is greater than a cross-sectional area of a refrigerant flow path formed in the heat transfer tube.

7. The heat exchanger according to claim 1,
wherein the heat transfer tubes are flat tubes in each of which a plurality of refrigerant flow paths are formed.

8. The heat exchanger according to claim 1,
wherein a length of the base portion in the second direction is less than a length of each of the protruding portions in the first direction.

9. The heat exchanger according to claim 8,
wherein the length of each of the protruding portions in the first direction is greater than or equal to twice the length of the base portion in the second direction.

10. The heat exchanger according to claim 1,
wherein the length of the base portion in the second direction is less than or equal to 4 mm.

11. The heat exchanger according to claim 1,
wherein the second member is an extrusion.

12. The heat exchanger according to claim 1,
wherein the first direction is a vertical direction.

13. The heat exchanger according to claim 1,
wherein a brazing material that joins the header body and the base portion is disposed between the header body and the base portion.

14. The heat exchanger according to claim 1,
wherein the header further includes a penetration member that extends in the second direction and extends through the header body, the first member, and the second member.

15. The heat exchanger according to claim 1,
wherein a plurality of engagement holes are formed in one of the header body and the first member, and
wherein engagement portions that engage with the engagement holes are formed in the other of the header body and the first member.

16. The heat exchanger according to claim 1,
wherein the first member is a member that extends in the first direction, and
wherein the first member includes
    a first portion that is positioned on the heat transfer tube side relative to the second member and into which the heat transfer tubes are inserted, and
    a second portion that extends in the second direction from each of two ends of the first portion in a transversal direction and that engages with the header body.

17. The heat exchanger according to claim 16,
wherein the header body includes a concave portion on a side opposite to the second member in the second direction, and
wherein the second portion
    has a length in the second direction that is greater than a length of the header body in the second direction,
    includes a convex portion at a tip end thereof in the second direction, and
    engages with the header body as the convex portion engages with the concave portion.

\* \* \* \* \*